United States Patent
McGuire, Jr. et al.

(10) Patent No.: US 11,884,849 B2
(45) Date of Patent: *Jan. 30, 2024

(54) PAINT FILM APPLIQUES WITH REDUCED DEFECTS, ARTICLES, AND METHODS

(71) Applicant: PPG Advanced Surface Technologies, LLC, Columbus, OH (US)

(72) Inventors: James E. McGuire, Jr., Palm Beach, FL (US); Andrew C. Strange, Worthington, OH (US); Matthew J. Canan, Hilliard, OH (US)

(73) Assignee: PPG Advanced Surface Technologies, LLC, Columbus, OH (US)

( * ) Notice: Subject to any disclaimer, the term of this patent is extended or adjusted under 35 U.S.C. 154(b) by 270 days.

This patent is subject to a terminal disclaimer.

(21) Appl. No.: 17/176,076

(22) Filed: Feb. 15, 2021

(65) Prior Publication Data

US 2021/0163791 A1 Jun. 3, 2021

Related U.S. Application Data

(60) Division of application No. 16/088,070, filed as application No. PCT/US2017/051466 on Sep. 14, 2017, now abandoned, which is a continuation-in-part of application No. PCT/US2017/021982, filed on Mar. 11, 2017.

(60) Provisional application No. 62/396,825, filed on Sep. 20, 2016.

(51) Int. Cl.
| | |
|---|---|
| *B29C 48/21* | (2019.01) |
| *C09J 7/29* | (2018.01) |
| *B29C 48/17* | (2019.01) |
| *C09J 7/38* | (2018.01) |
| *C09J 7/40* | (2018.01) |
| *C09J 7/25* | (2018.01) |
| *C09J 5/00* | (2006.01) |
| *B32B 27/08* | (2006.01) |
| *B32B 27/40* | (2006.01) |
| *B29K 75/00* | (2006.01) |
| *B29L 7/00* | (2006.01) |
| *B29L 9/00* | (2006.01) |

(52) U.S. Cl.
CPC .............. *C09J 7/29* (2018.01); *B29C 48/17* (2019.02); *B29C 48/21* (2019.02); *B32B 27/08* (2013.01); *B32B 27/40* (2013.01); *C09J 5/00* (2013.01); *C09J 7/25* (2018.01); *C09J 7/38* (2018.01); *C09J 7/385* (2018.01); *C09J 7/40* (2018.01); *B29K 2075/00* (2013.01); *B29K 2995/002* (2013.01); *B29L 2007/008* (2013.01); *B29L 2009/00* (2013.01); *B32B 2255/10* (2013.01); *B32B 2255/26* (2013.01); *B32B 2307/402* (2013.01); *B32B 2405/00* (2013.01); *C09J 2433/00* (2013.01); *C09J 2475/001* (2013.01); *C09J 2475/006* (2013.01)

(58) Field of Classification Search
None
See application file for complete search history.

(56) References Cited

U.S. PATENT DOCUMENTS

| | | |
|---|---|---|
| 2,914,556 A | 11/1958 | Hostettler et al. |
| 2,871,218 A | 1/1959 | Schollenberger |
| 3,294,724 A | 12/1966 | Axelrod |
| 3,296,196 A | 1/1967 | Lamoreaux |
| 3,463,662 A | 8/1969 | Hodes et al. |
| 3,509,015 A | 4/1970 | Wismer et al. |
| 3,523,100 A | 8/1970 | Stein et al. |
| 3,523,101 A | 8/1970 | Reuter |
| 3,539,424 A | 11/1970 | Tashlick |
| 3,549,583 A | 12/1970 | Nobuyoshi et al. |
| 3,554,951 A | 1/1971 | Blomeyer et al. |
| 3,616,198 A | 10/1971 | Kenji |
| 3,661,672 A | 5/1972 | John |
| 3,689,346 A | 9/1972 | Rowland |
| 3,695,972 A | 10/1972 | Lind et al. |
| 3,867,350 A | 2/1975 | Pedain et al. |
| 3,899,467 A | 8/1975 | Bonk et al. |
| 3,899,621 A | 8/1975 | Willdorf |
| 4,007,151 A | 2/1977 | Ogawa et al. |
| 4,034,708 A | 7/1977 | Fielder et al. |
| 4,081,578 A | 3/1978 | Van Essen et al. |
| 4,092,198 A | 5/1978 | Herbert et al. |
| 4,092,199 A | 5/1978 | Israel et al. |
| 4,093,766 A | 6/1978 | Herbert et al. |

(Continued)

FOREIGN PATENT DOCUMENTS

| | | |
|---|---|---|
| AU | 572168 | 5/1988 |
| CN | 101228030 | 7/2008 |

(Continued)

OTHER PUBLICATIONS

Arcol(R) PPG-1000 Data Sheet (Year: 2019).*
"3M Aircraft Belly Protective Tape 8641 Technical Data Sheet," Minnesota Mining & Manufacturing Co. (St. Paul, MN) Publication No. 70-0703-7681-2 (Mar. 2007).
"3M Paint Protection Film Builds Business through the SEMA Show," *3M Holding Fast*, 3M Automotive Division (St. Paul, MN), 1(25) (2002).
"3M Paint Protection Film: A Clear Alternative to Vehicle Bras or Guards," 3M Automotive Aftermarket Division 75-3467-9992-9, Minnesota Mining & Manufacturing Co. (St. Paul, MN) (2003).
"3M Polyurethane Protective Tape 8672/8672 GB Technical Data Sheet," Minnesota Mining & Manufacturing Co. (St. Paul, MN) Publication No. 78-9236-7045-5 (Nov. 2004).

(Continued)

*Primary Examiner* — Mohammad M Ameen
(74) *Attorney, Agent, or Firm* — Lisa M. Griffith, Esq.; The Griffith Law Firm, A P.C.

(57) ABSTRACT

In-situ polymerized polymer film facilitates improved paint film appliques with reduced defects. The paint film appliques comprise the in-situ polymerized polymer film as a carrier layer and at least one color layer assembled as a laminate, optionally further comprising at least one topcoat layer on one major surface of the laminate and an adhesive layer on the other major surface of the laminate.

30 Claims, 2 Drawing Sheets

(56) References Cited

U.S. PATENT DOCUMENTS

| | | |
|---|---|---|
| 4,101,698 A | 7/1978 | Dunning et al. |
| 4,131,602 A | 12/1978 | Hodakowski et al. |
| 4,154,882 A | 5/1979 | Israel et al. |
| 4,181,752 A | 1/1980 | Martens et al. |
| 4,201,799 A | 5/1980 | Stephens |
| 4,207,356 A | 6/1980 | Waugh |
| 4,241,140 A | 12/1980 | Ammons |
| 4,269,945 A | 5/1981 | Vanderhider |
| 4,292,827 A | 10/1981 | Waugh |
| 4,296,156 A | 10/1981 | Lustig et al. |
| 4,302,550 A | 11/1981 | Pisaric et al. |
| 4,332,074 A | 6/1982 | Auld et al. |
| 4,371,686 A | 2/1983 | Yamamoto et al. |
| 4,387,129 A | 6/1983 | Vincent |
| 4,420,525 A | 12/1983 | David |
| 4,476,293 A | 10/1984 | Robinson |
| 4,496,628 A | 1/1985 | Deatcher et al. |
| 4,501,852 A | 2/1985 | Markusch et al. |
| 4,530,976 A | 7/1985 | Kordomenos et al. |
| 4,540,622 A | 9/1985 | Brunion et al. |
| 4,550,052 A | 10/1985 | Malek |
| 4,578,426 A | 3/1986 | Lenz et al. |
| 4,590,218 A | 5/1986 | Vass |
| 4,611,043 A | 9/1986 | Burson et al. |
| 4,649,162 A | 3/1987 | Roche et al. |
| 4,657,795 A | 4/1987 | Foret |
| 4,652,494 A | 5/1987 | Bravet et al. |
| 4,705,721 A | 11/1987 | Frisch et al. |
| 4,741,961 A | 5/1988 | Frisch et al. |
| 4,745,152 A | 5/1988 | Fock et al. |
| 4,748,192 A | 5/1988 | Smith |
| 4,751,121 A | 6/1988 | Kuhnel et al. |
| 4,766,038 A | 8/1988 | De Vroom et al. |
| 4,774,043 A | 9/1988 | Beckmann |
| 4,810,540 A | 3/1989 | Ellison et al. |
| 4,816,542 A | 3/1989 | Liebl et al. |
| 4,900,611 A | 2/1990 | Carroll |
| 4,913,760 A | 4/1990 | Benson et al. |
| 4,917,928 A | 4/1990 | Heinecke |
| 4,919,994 A | 4/1990 | Joseph |
| 4,921,776 A | 5/1990 | Taylor |
| 4,931,324 A | 6/1990 | Ellison et al. |
| 4,933,237 A | 6/1990 | Krenceski et al. |
| 4,948,654 A | 8/1990 | Brooks et al. |
| 4,966,527 A | 10/1990 | Merz |
| 5,000,903 A | 3/1991 | Matzinger et al. |
| 5,034,275 A | 7/1991 | Pearson et al. |
| 5,055,346 A | 10/1991 | Rohrbacher |
| 5,070,172 A | 12/1991 | Hirai et al. |
| 5,077,373 A | 12/1991 | Tsuda et al. |
| 5,114,514 A | 5/1992 | Landis |
| 5,114,789 A | 5/1992 | Reafler |
| 5,123,814 A | 6/1992 | Burdick et al. |
| 5,141,783 A | 8/1992 | Corsi et al. |
| 5,148,574 A | 9/1992 | Leclere et al. |
| 5,155,201 A | 10/1992 | Gardon et al. |
| 5,183,597 A | 2/1993 | Lu |
| 5,203,189 A | 4/1993 | Lovejoy et al. |
| 5,215,811 A | 6/1993 | Reafler et al. |
| 5,219,643 A | 6/1993 | Schmidt et al. |
| 5,232,527 A | 8/1993 | Vernhet et al. |
| 5,242,744 A | 9/1993 | Schryer |
| 5,242,751 A | 9/1993 | Hartman |
| 5,260,095 A | 11/1993 | Affinito |
| 5,268,215 A | 12/1993 | Krenceski et al. |
| 5,288,356 A | 2/1994 | Benefiel |
| 5,306,548 A | 4/1994 | Zabrocki et al. |
| 5,310,080 A | 5/1994 | Figge |
| 5,334,450 A | 8/1994 | Zabrocki et al. |
| 5,342,666 A | 8/1994 | Ellison et al. |
| 5,391,686 A | 2/1995 | Jadhav et al. |
| 5,403,615 A | 4/1995 | Winkler et al. |
| 5,403,880 A | 4/1995 | Hegedus et al. |
| 5,405,675 A | 4/1995 | Sawka et al. |
| 5,428,087 A | 6/1995 | Petit et al. |
| 5,468,532 A * | 11/1995 | Ho .................. G02B 5/128 428/40.9 |
| 5,478,596 A | 12/1995 | Gurney |
| 5,486,096 A | 1/1996 | Hertel et al. |
| 5,518,786 A | 5/1996 | Johnson et al. |
| 5,556,677 A | 9/1996 | Quigley et al. |
| 5,560,979 A | 10/1996 | Bloom et al. |
| 5,562,979 A | 10/1996 | Easterlow et al. |
| 5,563,206 A | 10/1996 | Eicken et al. |
| 5,567,502 A | 10/1996 | Miyabara et al. |
| 5,582,887 A | 12/1996 | Etheredge |
| 5,587,230 A | 12/1996 | Lin et al. |
| 5,604,006 A | 2/1997 | Ponchaud et al. |
| 5,614,297 A | 3/1997 | Velazquez |
| 5,620,819 A | 4/1997 | Conforti et al. |
| 5,641,374 A | 6/1997 | Peterson et al. |
| 5,688,571 A | 11/1997 | Quigley et al. |
| 5,691,846 A | 11/1997 | Benson et al. |
| 5,707,941 A | 1/1998 | Haberle |
| 5,714,305 A | 2/1998 | Teng et al. |
| 5,736,204 A | 4/1998 | Suskind |
| 5,768,285 A | 6/1998 | Griep et al. |
| 5,770,313 A | 6/1998 | Furumoto et al. |
| 5,786,285 A | 7/1998 | Walla et al. |
| 5,820,491 A | 10/1998 | Hatch et al. |
| 5,848,769 A | 12/1998 | Fronek et al. |
| 5,849,168 A | 12/1998 | Lutz |
| 5,858,495 A | 1/1999 | Eikmeier et al. |
| 5,866,257 A | 2/1999 | Schledjewski et al. |
| 5,877,254 A | 3/1999 | La Casse et al. |
| 5,882,775 A | 3/1999 | Matsui et al. |
| 5,912,081 A | 6/1999 | Negele et al. |
| 5,912,193 A | 6/1999 | Iwata et al. |
| 5,912,195 A | 6/1999 | Walla et al. |
| 5,928,778 A | 7/1999 | Takahashi et al. |
| 5,939,188 A | 8/1999 | Moncur et al. |
| 5,945,199 A | 8/1999 | Morin et al. |
| 5,955,204 A | 9/1999 | Yamamoto et al. |
| 5,965,256 A | 10/1999 | Barrera |
| 5,968,444 A | 10/1999 | Yamamoto |
| 5,985,079 A | 11/1999 | Ellison |
| 6,001,906 A | 12/1999 | Golumbic |
| 6,037,054 A | 3/2000 | Shirai et al. |
| 6,045,864 A | 4/2000 | Lyons et al. |
| 6,054,208 A | 4/2000 | Rega et al. |
| 6,071,583 A | 6/2000 | Pomerantz |
| 6,096,396 A | 8/2000 | Patton et al. |
| 6,132,864 A | 10/2000 | Kiriazis et al. |
| 6,153,718 A | 11/2000 | Imashiro et al. |
| 6,177,189 B1 | 1/2001 | Rawlings et al. |
| 6,191,221 B1 | 2/2001 | McAmish et al. |
| 6,210,295 B1 | 4/2001 | Yoneyama |
| 6,210,796 B1 | 4/2001 | Lobert et al. |
| 6,254,712 B1 | 7/2001 | Enlow et al. |
| 6,258,918 B1 | 7/2001 | Ho et al. |
| 6,319,353 B1 | 11/2001 | Mussig |
| 6,336,666 B1 | 1/2002 | Trantoul |
| 6,336,988 B1 | 1/2002 | Enlow et al. |
| 6,369,186 B1 | 4/2002 | Branlard et al. |
| 6,383,644 B2 | 5/2002 | Fuchs |
| 6,389,602 B1 | 5/2002 | Alsaffar |
| 6,399,193 B1 | 6/2002 | Ellison |
| 6,436,531 B1 | 8/2002 | Kollaja et al. |
| 6,458,875 B1 | 10/2002 | Sandlin et al. |
| 6,458,880 B1 | 10/2002 | Onder et al. |
| 6,475,559 B1 | 11/2002 | Bettinger |
| 6,475,616 B1 | 11/2002 | Dietz et al. |
| 6,479,142 B1 | 11/2002 | Condon et al. |
| 6,485,836 B2 | 11/2002 | Reihs et al. |
| 6,518,359 B1 | 2/2003 | Clemens et al. |
| 6,518,389 B1 | 2/2003 | Kaufhold et al. |
| 6,521,164 B1 | 2/2003 | Plummer et al. |
| 6,521,337 B2 | 2/2003 | Yanagiuchi |
| 6,579,601 B2 | 6/2003 | Kollaja et al. |
| 6,592,173 B2 | 7/2003 | Hardgrive et al. |
| 6,602,591 B1 | 8/2003 | Smith |
| 6,607,831 B2 | 8/2003 | Ho et al. |
| 6,612,944 B1 | 9/2003 | Bureau |
| 6,624,276 B2 | 9/2003 | Lamers et al. |

(56) References Cited

U.S. PATENT DOCUMENTS

| | | |
|---|---|---|
| 6,627,018 B1 | 9/2003 | O'Neill et al. |
| 6,638,467 B1 | 10/2003 | Yamamoto |
| 6,642,159 B1 | 11/2003 | Bhatnagar et al. |
| 6,649,003 B1 | 11/2003 | Spain et al. |
| 6,649,693 B2 | 11/2003 | Konishi et al. |
| 6,651,011 B1 | 11/2003 | Bache |
| 6,659,625 B2 | 12/2003 | Hanasaki |
| 6,673,428 B1 | 1/2004 | Reafler |
| 6,677,028 B1 | 1/2004 | Lasch et al. |
| 6,680,111 B1 | 1/2004 | Leibler et al. |
| 6,682,679 B1 | 1/2004 | Marentic et al. |
| 6,709,723 B2 | 3/2004 | Roys et al. |
| 6,709,748 B1 | 3/2004 | Ho et al. |
| 6,713,185 B2 | 3/2004 | Carlson et al. |
| 6,723,427 B1 | 4/2004 | Johnson et al. |
| 6,723,472 B2 | 4/2004 | Nakanishi et al. |
| 6,726,971 B1 | 4/2004 | Wong |
| 6,730,388 B2 | 5/2004 | MacQueen et al. |
| 6,733,870 B2 | 5/2004 | Enlow et al. |
| 6,734,273 B2 | 5/2004 | Onder |
| 6,753,056 B1 | 6/2004 | Mizumoto |
| 6,755,757 B2 | 6/2004 | Sutherland |
| 6,762,243 B2 | 7/2004 | Stender et al. |
| 6,770,360 B2 | 8/2004 | Mientus et al. |
| 6,790,525 B2 | 9/2004 | Takeuchi et al. |
| 6,790,526 B2 | 9/2004 | Vargo et al. |
| 6,797,098 B2 | 9/2004 | Watanabe et al. |
| 6,806,212 B2 | 10/2004 | Fyfe |
| 6,811,628 B1 | 11/2004 | Reid et al. |
| 6,824,818 B2 | 11/2004 | McCoy et al. |
| 6,824,834 B2 | 11/2004 | Schafheutle et al. |
| 6,827,895 B1 | 12/2004 | Yamamoto |
| 6,835,267 B1 | 12/2004 | Spain et al. |
| 6,835,367 B2 | 12/2004 | Spain et al. |
| 6,838,130 B1 | 1/2005 | Spain et al. |
| 6,852,268 B1 | 2/2005 | Valyi et al. |
| 6,852,377 B2 | 2/2005 | Böhm et al. |
| 6,852,418 B1 | 2/2005 | Zurbig et al. |
| 6,866,383 B2 | 3/2005 | Kirit et al. |
| 6,869,496 B1 | 3/2005 | Kollaja et al. |
| 6,881,856 B2 | 4/2005 | Tanaka et al. |
| 6,890,628 B2 | 5/2005 | Kerr |
| 6,893,596 B2 | 5/2005 | Haas et al. |
| 6,894,084 B2 | 5/2005 | Kovar et al. |
| 6,908,401 B2 | 6/2005 | Cheng |
| 6,966,962 B2 | 11/2005 | Spain et al. |
| 6,998,084 B2 | 2/2006 | Horansky |
| 7,005,103 B2 | 2/2006 | Smith et al. |
| 7,005,183 B2 | 2/2006 | Kondo |
| 7,005,794 B2 | 2/2006 | Watanabe et al. |
| 7,011,777 B2 | 3/2006 | Schmidt |
| 7,048,989 B2 | 5/2006 | Watkins et al. |
| 7,074,463 B2 | 7/2006 | Jones et al. |
| 7,108,618 B2 | 9/2006 | Frischmon et al. |
| 7,128,669 B2 | 10/2006 | Blotteaux |
| 7,138,466 B2 | 11/2006 | Hung et al. |
| 7,141,294 B2 | 11/2006 | Sakurai et al. |
| 7,141,303 B2 | 11/2006 | Clemens et al. |
| 7,151,151 B2 | 12/2006 | Richter et al. |
| 7,157,527 B2 | 1/2007 | Kuntimaddi et al. |
| 7,157,572 B2 | 1/2007 | Lee |
| 7,160,973 B2 | 1/2007 | Ohrbom et al. |
| 7,166,249 B2 | 1/2007 | Abrams et al. |
| 7,279,057 B2 | 10/2007 | Reid et al. |
| 7,282,533 B2 | 10/2007 | Kreitschmann et al. |
| 7,316,832 B2 | 1/2008 | Steinhardt et al. |
| RE40,723 E | 6/2009 | Matsui et al. |
| 7,854,985 B2 | 12/2010 | Song et al. |
| 7,931,954 B2 | 4/2011 | Kobayashi et al. |
| 8,013,099 B2 | 9/2011 | Poppe et al. |
| 8,062,451 B2 | 11/2011 | Mozer et al. |
| 8,071,000 B2 | 12/2011 | Neitzke et al. |
| 8,105,686 B2 | 1/2012 | Blackwell et al. |
| 8,117,679 B2 | 2/2012 | Pierce |
| 8,501,315 B2 | 8/2013 | Tanaka et al. |
| 8,545,959 B2 | 10/2013 | McGuire et al. |
| 8,545,960 B2 | 10/2013 | McGuire et al. |
| 8,551,279 B2 | 10/2013 | Johnson et al. |
| 8,568,849 B2 | 10/2013 | Shi et al. |
| 8,765,263 B2 | 7/2014 | Ho et al. |
| 8,828,303 B2 | 9/2014 | McGuire, Jr. et al. |
| 8,927,106 B2 | 1/2015 | Ho et al. |
| 9,292,128 B1 | 3/2016 | Huang |
| 9,790,318 B2 | 10/2017 | McGuire, Jr. et al. |
| 10,253,209 B2 | 4/2019 | Fuchs |
| 10,981,371 B2 | 4/2021 | McGuire, Jr. |
| 11,420,427 B2 | 8/2022 | Mcguire, Jr. |
| 2002/0006516 A1 | 1/2002 | Ito et al. |
| 2002/0015772 A1 | 2/2002 | Munch et al. |
| 2002/0015842 A1 | 2/2002 | Yanagiuchi |
| 2002/0018889 A1 | 2/2002 | Franck et al. |
| 2002/0027362 A1 | 3/2002 | Trantoul |
| 2002/0061374 A1 | 5/2002 | O'Brien et al. |
| 2002/0132049 A1 | 9/2002 | Leonard et al. |
| 2002/0157772 A1 | 10/2002 | Enlow et al. |
| 2002/0193460 A1 | 12/2002 | Kovar et al. |
| 2002/0195910 A1 | 12/2002 | Hus et al. |
| 2003/0003282 A1 | 1/2003 | Roys et al. |
| 2003/0026932 A1 | 2/2003 | Johnson et al. |
| 2003/0060574 A1 | 3/2003 | Muller et al. |
| 2003/0075264 A1 | 4/2003 | Terakado et al. |
| 2003/0138842 A1 | 7/2003 | Seul et al. |
| 2003/0148044 A1 | 8/2003 | Auld et al. |
| 2003/0203190 A1 | 10/2003 | Schmidt et al. |
| 2003/0211334 A1 | 11/2003 | Jones |
| 2004/0048073 A1 | 3/2004 | Bacon |
| 2004/0071980 A1 | 4/2004 | McBain et al. |
| 2004/0096630 A1 | 5/2004 | Sakurai et al. |
| 2004/0145092 A1 | 7/2004 | McCollum et al. |
| 2004/0159969 A1 | 8/2004 | Truog et al. |
| 2004/0161567 A1 | 8/2004 | Truog et al. |
| 2004/0170793 A1 | 9/2004 | Linden et al. |
| 2004/0197572 A1 | 10/2004 | Bell |
| 2004/0200564 A1 | 10/2004 | Kinsey et al. |
| 2004/0208998 A1 | 10/2004 | Steininger et al. |
| 2004/0209057 A1 | 10/2004 | Enlow et al. |
| 2004/0214007 A1 | 10/2004 | Brown et al. |
| 2005/0042431 A1 | 2/2005 | Wagenblast |
| 2005/0059309 A1 | 3/2005 | Tsotsis |
| 2005/0069686 A1 | 3/2005 | Hoops |
| 2005/0069698 A1 | 3/2005 | Eubanks et al. |
| 2005/0084696 A1 | 4/2005 | Gaggar et al. |
| 2005/0113194 A1 | 5/2005 | Pearson |
| 2005/0136205 A1 | 6/2005 | Stoppelmann et al. |
| 2005/0137375 A1 | 6/2005 | Hansen et al. |
| 2005/0148404 A1 | 7/2005 | Ignatius |
| 2005/0156358 A1 | 7/2005 | Bellefleur et al. |
| 2005/0159060 A1 | 7/2005 | Shao |
| 2005/0164008 A1 | 7/2005 | Rukavina |
| 2005/0175794 A1 | 8/2005 | Dathe |
| 2005/0175818 A1 | 8/2005 | Kawabata et al. |
| 2005/0181203 A1 | 8/2005 | Rawlings et al. |
| 2005/0186415 A1 | 8/2005 | Mccormick et al. |
| 2005/0191490 A1 | 9/2005 | Ton-That et al. |
| 2005/0214559 A1 | 9/2005 | Minoda et al. |
| 2006/0046028 A1 | 3/2006 | Kaminski et al. |
| 2006/0127666 A1 | 6/2006 | Fuchs |
| 2007/0036929 A1 | 2/2007 | Baird et al. |
| 2007/0047099 A1 | 3/2007 | Clemens et al. |
| 2007/0116933 A1 | 3/2007 | Kobayashi et al. |
| 2007/0149749 A1 | 6/2007 | Rukavina et al. |
| 2007/0166548 A1 | 7/2007 | Gruber et al. |
| 2007/0178239 A1 | 8/2007 | Kestell et al. |
| 2008/0003406 A1 | 1/2008 | Steelman |
| 2008/0026233 A1 | 1/2008 | Kunz et al. |
| 2008/0199704 A1 | 8/2008 | Ho et al. |
| 2008/0261014 A1 | 10/2008 | McGuire, Jr. et al. |
| 2008/0286576 A1* | 11/2008 | McGuire, Jr. ............ B32B 27/08 156/60 |
| 2009/0186198 A1 | 7/2009 | McGuire, Jr. |
| 2009/0260741 A1 | 10/2009 | Anderson |
| 2009/0292057 A1 | 11/2009 | Handa et al. |
| 2009/0297724 A1 | 12/2009 | Weber |
| 2010/0059167 A1 | 3/2010 | McGuire, Jr. |

(56) References Cited

U.S. PATENT DOCUMENTS

| | | |
|---|---|---|
| 2010/0062250 A1 | 3/2010 | Johnson et al. |
| 2010/0068446 A1 | 3/2010 | McGuire, Jr. et al. |
| 2010/0089434 A1 | 4/2010 | Fishman |
| 2011/0045306 A1 | 2/2011 | Johnson et al. |
| 2011/0064900 A1 | 3/2011 | Uesugi et al. |
| 2011/0133598 A1* | 6/2011 | Jenninger ............... H01L 41/45 29/25.35 |
| 2011/0137006 A1* | 6/2011 | McGuire, Jr. ...... C08G 18/0895 528/85 |
| 2011/0241261 A1 | 10/2011 | McGuire, Jr. et al. |
| 2011/0268964 A1 | 11/2011 | Dornbusch et al. |
| 2012/0160402 A1 | 6/2012 | Ho et al. |
| 2012/0220913 A1 | 8/2012 | Kosthorst et al. |
| 2012/0255562 A1 | 10/2012 | McGuire, Jr. et al. |
| 2013/0045371 A1 | 2/2013 | O'Donnell |
| 2013/0316115 A1 | 11/2013 | Smith et al. |
| 2014/0030462 A1 | 1/2014 | Sullivan |
| 2014/0212674 A1 | 7/2014 | Ho et al. |
| 2014/0295181 A1 | 10/2014 | Minomo et al. |
| 2015/0044456 A1 | 2/2015 | Chien et al. |
| 2015/0099113 A1 | 4/2015 | Ho et al. |
| 2015/0166831 A1 | 6/2015 | Kuehneweg et al. |
| 2015/0330231 A1 | 11/2015 | McGuire, Jr. et al. |
| 2015/0361306 A1 | 12/2015 | McGuire, Jr. |
| 2016/0062016 A1 | 3/2016 | Lee et al. |
| 2016/0103250 A1 | 4/2016 | Snyder et al. |
| 2016/0251552 A1* | 9/2016 | Das ........................ B32B 7/12 428/221 |
| 2018/0163093 A1 | 6/2018 | McGuire, Jr. |
| 2018/0163094 A1 | 6/2018 | McGuire, Jr. |
| 2018/0194973 A1 | 7/2018 | McGuire, Jr. |
| 2018/0291236 A1 | 10/2018 | McGuire, Jr. |
| 2019/0136095 A1 | 5/2019 | McGuire, Jr. et al. |
| 2019/0238171 A1 | 8/2019 | McGuire, Jr. |
| 2021/0171807 A1 | 6/2021 | McGuire, Jr. et al. |

FOREIGN PATENT DOCUMENTS

| | | |
|---|---|---|
| CN | 102027088 | 4/2011 |
| DE | 02600241 | 7/1977 |
| DE | 19715871 | 6/1998 |
| DE | 10214827 | 10/2003 |
| EP | 0271941 | 6/1988 |
| EP | 0251546 | 3/1992 |
| EP | 0978374 | 2/2000 |
| EP | 1144125 | 7/2003 |
| EP | 1386950 | 2/2004 |
| EP | 0808885 | 4/2004 |
| EP | 1004608 | 10/2004 |
| EP | 1481031 | 7/2007 |
| EP | 2340164 | 7/2011 |
| EP | 2371881 | 10/2011 |
| EP | 1874541 | 11/2011 |
| EP | 2404729 | 1/2012 |
| EP | 2463093 | 6/2012 |
| EP | 2463094 | 6/2012 |
| EP | 2818488 | 12/2014 |
| EP | 2944565 | 11/2015 |
| EP | 1937475 | 9/2017 |
| EP | 2076388 | 12/2019 |
| FR | 2762336 | 10/1998 |
| GB | 2021599 | 12/1979 |
| GB | 1590413 A | 6/1981 |
| GB | 2194951 | 3/1988 |
| JP | 58-136438 A | 8/1983 |
| JP | 02-169228 | 6/1990 |
| JP | 05-339816 | 12/1993 |
| JP | 06-143506 | 5/1994 |
| JP | 07-052176 | 2/1995 |
| JP | 07-074322 | 8/1995 |
| JP | H11-506707 A | 6/1999 |
| JP | 2000-260252 | 9/2000 |
| JP | 2001-253033 | 9/2001 |
| JP | 2003-027016 A | 1/2003 |
| JP | 2003-527258 | 9/2003 |
| JP | 2004-511614 A | 4/2004 |
| JP | 2014-145034 A | 8/2004 |
| JP | 2004-307532 | 11/2004 |
| JP | 2005-125506 | 5/2005 |
| JP | 2005-206724 | 8/2005 |
| JP | 2005-335120 | 12/2005 |
| JP | 2007-522972 A | 8/2007 |
| JP | 2008-539107 A | 11/2008 |
| JP | 2009-515745 A | 4/2009 |
| JP | 2009-096186 A | 5/2009 |
| JP | 2009-299035 A | 12/2009 |
| JP | 2001-011403 | 1/2011 |
| JP | 2013-039724 A | 2/2013 |
| JP | 2013-237216 A | 11/2013 |
| JP | 2014-058159 A | 4/2014 |
| JP | 2016-523742 A | 8/2016 |
| KR | 101221441 | 1/2013 |
| KR | 101353366 | 1/2014 |
| KR | 101419056 | 7/2014 |
| WO | WO-90/011878 | 10/1990 |
| WO | WO-92/002731 | 2/1992 |
| WO | WO-92/016367 | 10/1992 |
| WO | WO-92/022619 | 12/1992 |
| WO | WO-93/024551 | 12/1993 |
| WO | WO-94/013465 | 6/1994 |
| WO | WO-96/010595 | 4/1996 |
| WO | WO-97/028472 | 8/1997 |
| WO | WO-98/037115 | 8/1998 |
| WO | WO-2001/029144 | 4/2001 |
| WO | WO-2002/028636 | 4/2002 |
| WO | WO-2002/031074 | 4/2002 |
| WO | WO-2003/002680 | 1/2003 |
| WO | WO-2003/049942 | 6/2003 |
| WO | WO-2003/074273 | 9/2003 |
| WO | WO-2003/076542 | 9/2003 |
| WO | WO-2004/067246 | 8/2004 |
| WO | WO-2014/209928 | 12/2004 |
| WO | WO-2005/032812 | 4/2005 |
| WO | WO-2006/118883 | 11/2006 |
| WO | WO-2007/033786 | 3/2007 |
| WO | WO-2007/048141 | 4/2007 |
| WO | WO-2007/048145 | 4/2007 |
| WO | WO-2007/120188 | 10/2007 |
| WO | WO-2008/051629 | 5/2008 |
| WO | WO-2008/109733 | 9/2008 |
| WO | WO-2009/041964 | 4/2009 |
| WO | WO-2010/036981 | 4/2010 |
| WO | WO-2013/099829 A1 | 4/2013 |
| WO | WO-2015/195494 | 12/2015 |
| WO | WO-2016/018749 | 2/2016 |
| WO | WO-2016/076337 | 5/2016 |
| WO | WO-2017/156506 | 9/2017 |
| WO | WO-2017/156507 | 9/2017 |
| WO | WO-2018/045353 | 3/2018 |
| WO | WO-2018/057378 | 3/2018 |
| WO | WO-2018/057379 | 3/2018 |

OTHER PUBLICATIONS

"3M Polyurethane Protective Tape 8674/8674DL Technical Data Sheet," Minnesota Mining & Manufacturing Co. (St. Paul, MN) Publication No. 60-9700-0074-5 (Nov. 2005).

"Aircraft Painting," *KLM Engineering & Maintenance*, www.klm-em.com (Jun. 27, 2007).

"An Amazing New Automotive Finish Protection Film to Keep Your Vehicle in Showroom Condition . . . VentureShield," (http://www.venturetape.com/final/new_products.htm) VentureTape (Rockland, MA).

ARCOL® PPG-1000 Data Sheet, Covestro, Edition Dec. 29, 2014 (2019).

"Argotec 49510 Technical Data Sheet," Argotech, Inc. (Greenfield, MA) (Oct. 2003).

"Argotec Fills Industry Need with Thin, Aliphatic-Grade Polyurethane Films," *Argotec Press Release*, www.argotecinc.com (2006).

"Avery Dennison StoneShield Technical Data Sheet".

Ballistic Glass Products—Tech Armor [retrieved on Apr. 5, 2016 from http://www.techarmor.com/ballistic-glass].

(56) References Cited

OTHER PUBLICATIONS

"Blade Protection Kits Keep Helicopters in the Air," *EngineeringTalk* (www.engineeringtalk.com/news/mmr/mmr102.html) (Sep. 16, 2005).
"CAB-O-SIL TS-720," Cabot Corporation (Billerica, MA) PDS-141 (Jan. 2006).
"ECLIPSE High Performance Exterior Topcoat," *Akzo Nobel Aerospace Coatings*, www.akzonobelaerospace.com.
Edge to Edge Products—Tech Armor [retrieved on Feb. 3, 2016 from http://www.techarmor.com/edgetoedge].
"EPON Resin 828 Product Bulletin", Resolution Performance Products (Houston, TX) RP:3075-01 (Apr. 2002).
"EPON Resin 862 Product Bulletin," Resolution Performance Products (Houston, TX) RP:4048 (Mar. 2005).
"EPON Resin 863 Technical Data Sheet," Hexion Specialty Chemicals (Houston, TX) RP:4041 (Jun. 2004).
"EPON Resin Structural Reference Manual—EPON Resins—EPI-CURE Curing Agents—Heloxy Modifiers," Resolution Performance Products (Houston, TX), pp. 3i to 3-6 (2001).
"EPON Resins and Modifiers," Resolution Performance Products SC:3059-01 (2002).
"Epoxy Curing Agents and Modifiers: Amicure CG-1200 Curing Agent," Air Products and Chemicals (Allentown, PA) Publication No. 125-9416.7.
"Epoxy Curing Agents and Modifiers: Amicure UR Curing Agent," Air Products and Chemicals (Allentown, PA) Publication No. 125-9416.11.
"Epoxy Curing Agents and Modifiers: Ancamine 2441 Curing Agent," Air Products and Chemicals (Allentown, PA) Publication No. 125-04-017-GLB (2004).
"Ford Pressure Sensitive Performance Testing (Venture Tape) for Test Materials: 7510 and 7514," ACT Laboratories, Inc. (Hillsdale, MI), published at: http://www.invisiblepatterns.com/pdf/AIN154314C.pdf, (Dec. 30, 2005).
"Improved Scotchgard Paint Protection Film Uses Latest 3M Technology," *3M News: SEMA Show 2005*, (Nov. 1, 2005).
IPhone 6 Screen Protector Steinheil Curved Crystal—Spigen, Inc. [retrieved on Feb. 10, 2016 from http://www.spigen.com/products/iphone-6-screen-protector-steinheil-curved-crystal-4-7].
"Paint Protection Film FAQ's," previously published at: http://enprodistributing.com/products/protection/faq.htm, (Jul. 12, 2005).
"Polyurethane Coatings for Automotive Exteriors," published at: http://www.bayermaterialscienceafta.com/industries/automotive/coatings.html#3.
"Scotchgard Paint Protection Film SGPF6 For Professional Applicators," 3M Technical Data Sheet 75-3469-1065-8, Minnesota Mining & Manufacturing Co. (St. Paul, MN) (Apr. 2004).

"Scotchgard Paint Protection Film: Application Guide for Professional Applicators," 3M Technical Update 75-3469-1102-9, Minnesota Mining & Manufacturing Co. (St. Paul, MN) (Apr. 2004).
"Test Report—Venture Shield 7510," Bodycote Materials Testing Met-Chem Laboratory, published at: http://www.invisiblepatterns.com/pdf/067682.pdf, Letter Dated Jan. 14, 2003—Report No. 067682 (Jan. 14, 2003).
"Venture Shield—Paint Protection 7512", VentureTape (Rockland, MA), published at: http://www.venturetape.com/final/automotive_products.asp?id=610 (Jul. 12, 2005).
"Venture Shield Paint Protection 7510," VentureTape (Rockland, MA), published at: http://www.venturetape.com/final/automotive_products.asp?id=609 (Jul. 12, 2005).
"3M FTA 9055 J—3M™ Premium Plus Blackout Film with Comply™ Feature," Technical Data Sheet FTA 9055 J E_01/MW, Rev. 1, Ref. TL-10177, retrieved on Sep. 12, 2017 from http://multimedia.3m.com/mws/media/880023O/3m-premium-plus-blackout-film-with-comply-feature.pdf (Jun. 2008).
"3M Paint Replacement Film F577," Technical Data Sheet, retrieved on Sep. 12, 2017 from https://multimedia.3m.com/mws/media/514553O/3mtm-paint-replacement-film-f577.pdf (Mar. 2017).
"3M™ Paint Replacement Films with Comply™ Adhesive Performance," Technical Bulletin, retrieved on Sep. 12, 2017 at http://multimedia.3m.com/mws/media/5575340/3m-paint-replacement-film-with-comply-adh-perf-tech-bulletin.pdf (Nov. 2008).
"Laminating Problems and Solutions," Mactac Technical Bulletin 7.8, vol. 2, retrieved on Sep. 13, 2017 from http://www.mactac.eu/datas/files/Technical%20Bulletin%207%208%20Laminating%20problems%20%20solutions.pdf (Sep. 2012).
"SABIC Innovative Plastics™ Lexan SLX Resin," SABIC-PLA-829, retrieved on Sep. 12, 2017 from http://www.pod-sabic-ip.com/KBAM/Reflection/Assets/Thumbnail/8457_15.pdf (Dec. 2008).
*AircraftLog: Where Smart Solutions Take Flight*, PPG Industries, Inc. (Huntsville, AL) (May 2005), pp. 10-11 and 16.
*Engineering EDGE*, Air France KLM (Jan. 2006).
Hackett, Earl T., "Film Inspection Using Cross-Polarized Light: The Old Method Can Give New Life to Film Inspection Procedures," *Pharmaceutical & Medical Packaging News*—http://www.devicelink.com/pmpn/archive/04/07/004.html, (Jul. 2004).
Shaoming, Fang, et al., *Polymer Material Molding Engineering*, The First Edition, China Light Industry Press, p. 134 (Jun. 1, 2014).
Umamaheswaran, Venkatakrishnan et al., "New Weatherable Film Technology to Eliminate Painting of Automotive Exteriors," *Society of Automotive Engineers*: 2001-01-0443, (2001).
Wagner, Matthias, *Thermal Analysis in Practice*, The First Edition, Lu Liming, Donghua University Press, pp. 146-148 (Jan. 1, 2011).

\* cited by examiner

PAINT FILM APPLIQUES WITH REDUCED DEFECTS, ARTICLES, AND METHODS

CROSS-REFERENCE TO RELATED APPLICATIONS

This application claims priority from U.S. Provisional Patent Application No. 62/396,825, filed on Sep. 20, 2016, and PCT Patent Application No. PCT/US17/21982, filed on Mar. 11, 2017, both of which are incorporated by reference herein in their entirety.

BACKGROUND OF THE INVENTION

The present invention relates generally to paint film appliques with reduced defects, methods of making and using the same, and articles comprising the same.

Painted surfaces are commonly used in many different types of applications. Painted surfaces can not only improve aesthetic properties of a surface, but they can also improve functional properties of underlying surfaces and help protect the same. One such application is in the transportation industry, where exterior painted surfaces are typically exposed to a variety of environments, some of which can be very harsh on the surface. Examples of articles in the transportation industry having such painted surfaces include vehicles providing transportation over land, in the water, and in the air. Such vehicles include aircraft and motorized vehicles like automobiles and trucks. The paint on such surfaces can function to protect the underlying surface from damage due to that exposure. However, the paint itself must also be durable to withstand repeated exposure to such damaging environments.

Painting exterior surfaces on vehicles poses many challenges, not only due to the amount of surface area typically requiring painting and the often uneven topography of such surfaces, but also due to increasingly stringent environmental regulations. For example, there is a desire for and increasingly regulations requiring a reduction in Volatile Organic Component (VOC) emissions, particularly in industries utilizing significant amounts of paint and other organic chemicals. VOC emission reduction and water conservation, both associated with conventional painting processes, are therefore increasingly important environmental considerations.

A further consideration associated with painting exterior surfaces on vehicles, particularly in the transportation industry, is overall weight. The presence of paint on a surface, while increasing the aesthetic and functional properties of the surface, also increases the weight of the article to which it is applied. In the transportation industry, additional weight leads to consumption of excess fuel and restrictions on the number of passengers or amount of cargo that an associated vehicle can safely and efficiently transport.

Further, a unique consideration associated with painting or otherwise covering exterior surfaces on aircraft and similar vehicles is the impact of the relatively high vehicle speeds on the surface of the vehicle and any coatings or coverings thereon. For example, wind resistance associated with travel at high speeds can make it difficult to retain uniform and adequate adherence of such coatings or coverings on a vehicle's surface. Thus, coatings and coverings developed for application to exterior surfaces of vehicles traveling on, for example, land-based highways are often not adequate to withstand the challenging conditions associated with higher speeds of travel through air or on land-based raceways.

To overcome many of the challenges associated with painting exterior surfaces of vehicles using conventional methodology, a number of paint replacement technologies have been developed so that use of traditional paint can be minimized or avoided. For example, by infusing plastic with pigment, one commercially available product allows car manufacturers to remove the painting process from automobile production lines altogether. Such a product, which comprises a resin for formation of surfaces that are traditionally painted, is marketed under the LEXAN SLX trade designation by Saudi Basic Industries Corporation (SABIC).

Other alternatives to using conventional paint include adherence of a paint replacement film or sheet (also referred to as an applique) to a surface already formed on a vehicle. For example, 3M Company of St. Paul, MN markets paint replacement films and tapes for certain such applications. One such film—3M™ Paint Replacement Film F577—is described as a polyvinyl chloride film providing a textured black matte appearance for use on vehicle window frames, window sashes, window extensions, body and door pillars, dashboard components and lids (metal or plastic). Another such film—3M™ Paint Replacement Film FTA9055J—is described for use in providing the blackout appearance around automotive side glass. Such film is described as providing a high-gloss (90% reflectivity) black appearance and an outer clearcoat that can be integrated into vehicle designs. See also U.S. Patent Publication No. 2007/0047099; U.S. Pat. Nos. 5,965,256; 6,475,616; and 7,141,303, all of which are assigned to 3M Innovative Properties Company.

Other paint replacement technology is also known. For example, U.S. Pat. No. 5,034,275 refers to a paint-coated sheet material. The material purportedly comprises a flexible and stretchable thermoplastic polyester carrier film, a stretchable aqueous polyurethane paint layer, a stretchable transparent crosslinked polyurethane topcoat layer and, disposed between the carrier film and the paint layer, a thin tie layer formed by coating an aqueous dispersion of a neutralized copolymer of ethylene and an ethylenically unsaturated carboxylic acid on the carrier film.

U.S. Pat. No. 5,114,789 describes a decorative sheet material having a transparent topcoat that can be bonded to various substrates, such as exterior automotive panels, as a protective and decorative coating. The sheet material comprises a thin carrier film, a paint layer adhered to one surface of the carrier film, and a crosslinked topcoat layer. That topcoat layer is stated to be "extremely thick"—at least 0.1 millimeter (100 microns)—in embodiments described therein.

U.S. Pat. No. 5,242,751 describes a paint composite article including a thermally deformable carrier film having, on its first major surface, an adhesive layer and, on its second major surface, a paint layer consisting of a pigmented basecoat covered by a polyurethane topcoat layer.

U.S. Pat. No. 5,268,215 describes a paint-coated film purportedly having good mar resistance. A polyurethane paint layer is coated on a polymeric carrier film. Coated on the upper surface of the paint layer is a polyurethane clearcoat layer, which is then coated with a polyurethane-siloxane topcoat layer. The film can purportedly be thermoformed, stretched, and bonded adhesively to auto body parts, boats, household appliances, and other substrates as protective and decorative coverings having a basecoat-clearcoat appearance.

U.S. Pat. No. 5,468,532 describes a multi-layer graphic article with a color layer. It is based on a polymeric film that is covered with a protective surface layer to purportedly make the article weatherable and resistant to chemical exposure. The protective surface layer is described as being a polyurethane-based material in an exemplary embodiment.

U.S. Pat. No. 6,132,864 describes a painted plastic film coated with two or more coats of certain materials. It consists of a base plastic film, which is first coated with a filler composition, followed by coating with a pigmented paint, and then coating with a transparent plastic film. The base plastic film can be a polyolefin, a polyamide, a polyurethane, a polyester, a polyacrylate, a polycarbonate or mixture of different polymeric substances. The filler composition is described as a composition containing a binder and crosslinking agent among other components. The pigmented paint coating is described as a topcoat comprising a polymeric binder, with or without a crosslinking agent, and a pigment or mixture of pigments. The transparent plastic film is described as being one of the same materials suitable for use as the base film. The multi-layer sheets described therein purportedly have good resistance to stone chipping and corrosion.

Despite the number of paint replacement technologies, conventional technology has not satisfactorily addressed paint replacement in all situations, particularly applications involving vehicles used for transportation. Not only are adequate adhesion and durability issues for exterior surfaces on such vehicles due to their typical exposure to high wind resistance, but other issues exist as well.

As one example, many transportation vehicles increasingly rely on use of composite materials for surfaces to which conventional paint replacement materials are adhered. Conventional paint replacement materials, however, often do not adhere as well to composite materials as they do to individual materials. It is known that the ability of conventional paint replacement materials to adhere adequately to all surfaces, including those formed from composite materials, and provide the desired aesthetic and functional properties is often inadequate. Not only is it desirable for a material to adhere adequately to a surface, but it is also desirable to be able to remove the material easily when desired. In the case of an aircraft, for example, company logos and designs often change, which leads to a desire to refinish aircraft displaying outdated logos and designs. This is particularly prevalent in the case of leased aircraft, which often undergo multiple and repeated changes of possession and, thus, changes in associated individual or company logos and designs. Typically paint replacement films present on a surface must first be removed when refinishing the surface. Many conventional films, however, are not easily removable as the layers therein are prone to delamination. Delamination of the paint replacement film when removing the same from a surface can significantly complicate the refinishing process.

Even when paint, as opposed to a paint replacement film, is present on a surface to be refinished, the refinishing process can be problematic. Refinishing painted surfaces typically entails sanding the surface in preparation for applying a fresh coat of paint thereon. Composite material surfaces must usually rely on sanding to remove undesired paint thereon when refinishing because most chemical strippers are not able to be used on composite materials. Sanding surfaces formed from composite materials, however, is also not desirable due to the likelihood that such sanding will result in damage to (e.g., breakage of) the composite's reinforcement material (especially when that reinforcement material comprises fibers).

As another example, due to manufacturing methodology typically employed for formation of base/carrier films conventionally used in multi-layer film products (such as paint replacement appliques), which methodology typically involves extrusion and other methods for formation of a film from an already polymerized composition, chemical and physical properties of such films have been limited. U.S. Pat. No. 8,828,303 describes some of these limitations. For example, some polymer chemistries are not capable of being hot-melt processed due to their relatively high molecular weight and/or the presence of crosslinking, both of which can make it difficult, if not impossible, to hot-melt process preformed pellets of the compositions (as is done generally according to conventional methods of forming polymer films using hot-melt processing) at a temperature below the degradation temperature of the polymer composition or substrate onto which the film is formed.

Wet casting polymer film formation methods also have their disadvantages. Whether the system is solventborne or waterborne, it must first be coated onto a desired substrate and then dried to remove solvating or dispersing medium (i.e., organic solvent or water, respectively) in order to form a polymer film. Thus, formation of polymer films of sufficient thickness can be problematic using wet casting methods. In addition, some polymer chemistries are not capable of being formed into polymer films using wet casting methods due to the lack of adequate solubility of such polymers or their constituents in conventional solvents and dispersing mediums.

Thus, the properties of conventionally manufactured polymer films are limited to those particular polymer chemistries that can be formed into films using conventional methodology, again which methodology typically involves extrusion and other methods for formation of a film from an already polymerized composition. Due to the methodology by which they are formed as well as methodology by which they are laminated to adjacent films, conventionally manufactured polymer films typically suffer from defects arising from at least one of gelation, die lines, and gauge lines. Due to their negative impact on, for example, visual properties of the final product, the prevalence of defects necessitates exhaustive testing and analysis of polymer film formed to ensure suitability of that polymer film for the intended application.

Gelation results in the presence of gel particles (also referred to as "gel") in the final product. A "gel" is generally understood to be a viscous composition, which in polymer processing can be, for example, an at least partially polymerized composition, one having a relatively high molecular weight, and/or one containing significant amounts of entrapped gas (e.g., air or reaction by-products, such as carbon dioxide). Gels may manifest themselves in various forms and often result from overheating during processing of polymerized compositions into polymer films. For example, gels may take a crosslinked form, result from catalyst or other organic or inorganic residue in stagnating and/or dead regions of resins during extrusion, result from degraded oxidation-related occurrences (e.g., carbon dioxide bubbles resulting from moisture), or have their roots in the supply chain. Gelation can make formation of uniform layers of polymeric material (e.g., films) difficult.

Aside from formation of polymer films, to provide a colored or aesthetic desired appearance for use as a paint film applique, more than one polymer film, at least one of which is colored, are often provided and laminated together. However, when laminating polymer films together, defects often arise due to the manner in which polymer films are laminated. Conventionally polymer films are often laminated together using heat. Heat lamination, however, is known to produce a wide variety of defects. U.S. Pat. No.

5,641,374 describes problems associated with defects arising from heat lamination. Those defects include, for example, wrinkles, ripples, curl, excessive shrinkage or stretch, waves, waffle, color density loss, and microbubbles.

No matter their origin, defects can lead to aesthetic imperfections, weak points and rupturing in polymer films and paint film appliques and generally compromise their suitability for many applications. As such, exhaustive efforts are conducted throughout the supply chain to determine the presence and extent of defects. Many defects are readily detectable when viewed with an unaided human eye. Other methods for detection of defects can also be used, including spectroscopy. When detected, defect-laden polymer film must often be scrapped, leading to considerable waste.

As noted, a number of problems are inadequately addressed by conventional paint replacement technologies. Thus, alternative paint replacement technologies are still desired.

BRIEF SUMMARY OF THE INVENTION

Alternative polymer films for use in related paint film appliques and articles, as well as methods for their formation are desirable to impart improved properties thereto. According to the invention, an in-situ polymerized polymer film facilitates improved paint film appliques. Preferred are defect-free polymer films and paint film appliques of which they are a part, which, as a result, also have reduced defects.

In one embodiment, a paint film applique comprises a defect-free polymer film as a carrier layer. As compared to conventional multi-layer sheets including a conventionally formed polyurethane carrier layer (i.e., which conventional formation typically involves extrusion and other methods for formation of a film from an already polymerized composition, where polymerization of the material used to form the film is essentially complete prior to formation of the film therefrom), paint film appliques of the invention do not rely on such a layer as the carrier layer, the result being an improvement in one or more desired properties in addition to the processing efficiencies imparted thereby.

Defect-free polymer films useful as the carrier layer in paint film appliques of the invention are described in co-pending PCT Patent Application No. PCT/US17/21982, entitled "Defect-Free Polymer Films and Related Protective Sheets, Articles, and Methods," which application is incorporated by reference herein in its entirety. According to one aspect of the invention, the defect-free polymer film forming the carrier layer is polymerized in-situ on an adjacent color layer when assembling the paint film applique.

It is to be understood that, as used herein, when a polymerizable composition is polymerized into a desired polymer film "in-situ," polymerization of the polymer comprising the film begins just before, while, or shortly after the polymerizable composition is being positioned into the desired film format and polymerization is essentially completed during such positioning or shortly thereafter. Typically, "just before" and "shortly after," as used in reference to timing of when polymerization begins, refer to time periods of no more than about thirty seconds. Surprisingly, use of a carrier layer in-situ polymerized on an adjacent color layer was found to facilitate improvements in paint film applique properties desired in addition to the processing efficiencies imparted thereby.

DETAILED DESCRIPTION OF THE INVENTION

Figure 1:
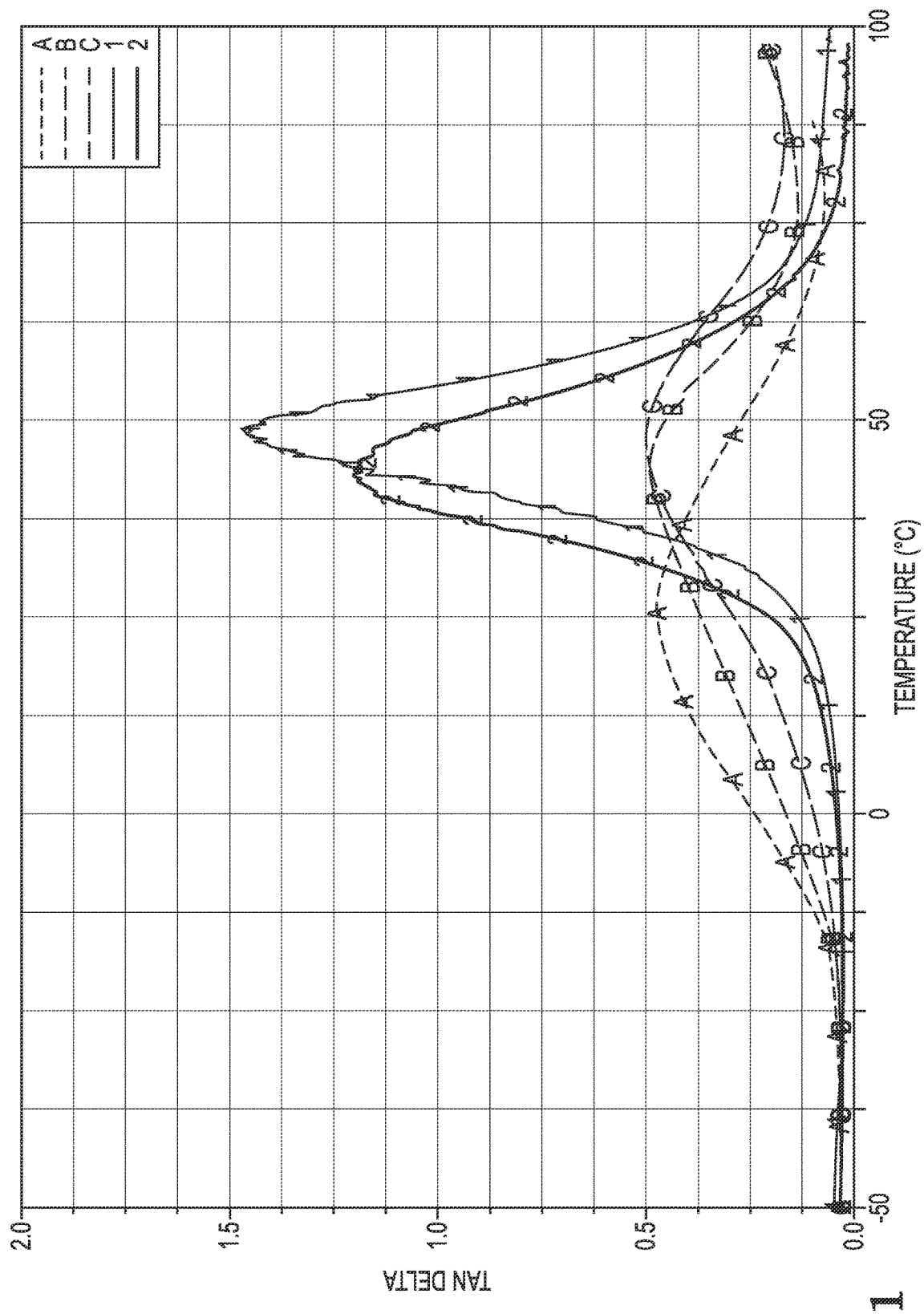
FIG. 1 is a graph of Loss Factor (also referred to as Tan Delta) versus Temperature for in-situ polymerized polyurethane carrier layers useful in paint film appliques of the invention as compared to those properties associated with conventionally formed polyurethane carrier layers.

The phrase "paint film applique" encompasses films including essentially one uniform color throughout as well as films which, by themselves or in combination with other paint replacement films, include graphics, patterns, and other non-uniformly dispersed color variations throughout. Paint film appliques of the invention generally comprise an in-situ polymerized polymer layer and a color layer. In further embodiments, paint film appliques comprise an adhesive layer with a color layer disposed therebetween and/or a color layer disposed on the exterior surface of the polymer layer. The color layer comprises at least one color-inducing component and provides the uniform or non-uniform color throughout the film. When the color-inducing component is a pigment, the color layer is also referred to in describing exemplary embodiments of the invention herein as a "pigmented layer."

Paint film appliques of the invention are advantageously not only capable of covering a surface with improved properties, but also capable of being more cleanly removed therefrom than conventional paint film appliques including conventionally formed carrier layers. It has been found that adhesive residue remaining on a surface from which the paint film applique is removed after use is minimized or eliminated by providing, adjacent a color layer, preferably a defect-free polymer film as a carrier layer that is capable of absorbing more energy during stretching and/or impact than that associated with conventionally formed carrier layers. That is, the improved carrier layer used in paint film appliques of the invention is capable of exhibiting more effective damping qualities (as evidenced by its "peak loss factor" described herein) than those associated with conventionally formed carrier layers. Including such a layer adjacent the color layer within a laminate facilitates better continued bonding between the carrier layer and the color layer during application of the paint film applique and, hence, a lower chance of interlayer delamination and less residual adhesive and other material on a surface after removal of the paint film applique therefrom.

According to another aspect of the invention, properties of individual layers within a paint film applique are better balanced according to the invention when using such a carrier layer. For example, when a relatively high modulus topcoat layer is present within the paint film applique as in multi-stage paint (e.g., having the appearance of a conventional base coat/clear coat paint finish), the carrier layer having a relatively high loss factor adjacent such a topcoat layer facilitates a more uniform rate and degree of recovery across thickness of the paint film applique when it is stretched and/or impacted.

Although the presence of a topcoat layer is optional, it can be present in, for example, a multi-stage paint according to the invention comprising the carrier layer (or multiples thereof, if desired) in combination with at least one color layer flanked by at least one adhesive layer on one side (i.e., the foregoing layers in combination being akin to a basecoat in a conventional paint system) and at least one topcoat layer (i.e., being akin to a clearcoat in a conventional paint system) on the other side.

It is to be understood that the number of stages associated with the paint generally corresponds to the number of topcoat layers within the paint film applique. For example, in one embodiment of a two-stage paint according to the invention, the paint film applique consists essentially of the following layers: the adhesive layer, the carrier layer, the color layer, and the topcoat layer, with the carrier layer and the color layer being positioned in any order between the adhesive layer and the topcoat layer. As another example of a two-stage paint according to the invention, the paint film applique consists essentially of the following layers: the adhesive layer, the carrier layer, two distinct color layers, and the topcoat layer, with the carrier layer and the two distinct color layers being positioned in any order between the adhesive layer and the topcoat layer. An exemplary three-stage paint according to the invention can comprise either of the foregoing two-stage paints with an additional topcoat layer adjacent the first topcoat layer.

Preferably, paint film appliques of the invention are advantageously not only capable of covering a surface with better balanced properties and leaving less residual adhesive after removal from a surface, but they also have enhanced recoverability to enable sufficient coverage and ease of application to non-planar surfaces. As used herein, "recoverability" refers to a material's ability to be stretched and recover to essentially its original state after stretching. Preferred paint film appliques are capable of recovering to essentially their original state when stretched (i.e., elongated) to a length of up to about 125% of their initial length. Preferably, paint film appliques are capable of recovering to essentially their original state when stretched to a length of up to about 150% of their initial length. According to one aspect of the invention, paint film appliques are capable of elongating to a length of up to more than about 200% of their initial length before breaking.

According to an exemplary embodiment of the invention, due to its method of formation, a paint film applique advantageously comprises a defect-free polymer film as a carrier layer adjacent a color layer. In a further embodiment, the paint film applique with the defect-free polymer film as a carrier layer also comprises at least one of a topcoat layer and an adhesive layer.

According to one aspect of this further embodiment, a paint film applique comprises sequential layers as follows: a defect-free polymer film as a carrier layer; a color layer; and, an adhesive layer. According to another aspect of this further embodiment, a paint film applique comprises sequential layers as follows: a color layer; a defect-free polymer film as a carrier layer; and, an adhesive layer. According to yet another aspect of this further embodiment, a paint film applique comprises sequential layers as follows: a topcoat layer; a defect-free polymer film as a carrier layer; and a color layer. According to another aspect of this further embodiment, a paint film applique comprises sequential layers as follows: a topcoat layer; a color layer; and a defect-free polymer film as a carrier layer.

Further embodiments of the latter two aspects include an adhesive layer in sequence, such that the adhesive layer is outwardly exposed adjacent the color layer or carrier layer. An exemplary paint film applique comprises sequential layers as follows: a topcoat layer; a defect-free polymer film as a carrier layer; a color layer; and, an adhesive layer. Another exemplary paint film applique comprises sequential layers as follows: a topcoat layer; a color layer; a defect-free polymer film as a carrier layer; and, an adhesive layer.

For ease of handling and minimization of weight and cost, preferably overall thickness of the paint film applique is less than about 130 microns thick. In one embodiment, overall thickness of the paint film applique is about 100 microns to about 130 microns thick. In another embodiment, overall thickness of the paint film applique is about 50 microns to about 75 microns thick. Each of the individual and discrete layers within the paint film applique is described in further detail below.

Carrier Layer

By use of "carrier layer" herein, it is to be understood that the polymer film comprising the same carries (i.e., supports) at least an adhesive layer and a distinct color layer within a paint film applique. Although thickness of the color layer and/or adhesive layer may be greater than that of the carrier layer, the carrier layer is an essential element to providing paint film appliques having desired properties, whether those properties by aesthetic, functional, or otherwise.

The carrier layer is in-situ polymerized on an adjacent color layer when assembling paint film appliques of the invention. According to preferred embodiments of the invention, a defect-free layer(s) of polymer film supporting at least one other layer functions as the carrier layer. In certain contexts, a carrier layer may also be referred to as a "base layer," "support layer," or a similar designation. In general, the carrier layer of paint film appliques of the invention is referred to as a "mid-ply layer" when it contains multiple layers (i.e., "n" number of individual layers). However, the carrier layer of paint film appliques of the invention can be a single film layer according to other embodiments of the invention. When multiple layers form the carrier layer, each of the "n" individual layers can be the same or different chemistries. In an exemplary embodiment, each of the "n" individual layers has essentially the same chemistry.

The carrier layer may be clear or pigmented depending on the application. When the carrier layer is clear, the color layer is typically provided between the carrier layer and an adhesive layer. Alternatively, or in conjunction with another color layer, when the carrier layer is clear, a color layer can be provided on the outer surface of the carrier layer. When the carrier layer is pigmented, the color layer is generally provided on the outer surface of the carrier layer. In this embodiment, the carrier layer can be impregnated with a material (e.g., titanium dioxide) that causes the carrier layer to function as a reflective background, bringing out the color of the overlying color layer when the paint film applique is applied to a surface.

According to one preferred aspect of the invention, carrier layers used in paint film appliques of the invention are polyurethane-based. For simplicity, the term "polyurethane" as used herein includes polymers containing urethane (also known as carbamate) linkages, urea linkages, or combinations thereof (i.e., in the case of poly(urethane-urea)s). Thus, polyurethane-based carrier layers contain at least urethane linkages, urea linkages, or combinations thereof. Furthermore, polyurethane-based carrier layers are based on polymers where the polymeric backbone has at least 40%, preferably at least 60%, and more preferably at least 80% urethane and/or urea repeat linkages formed in-situ during the polymerization process.

Polyurethane-based carrier layers are prepared according to methods of the invention by reacting components, which include at least one isocyanate-reactive (e.g., hydroxy-functional, such as polyol) component and at least one isocyanate-functional (e.g., polyisocyanate) component. For example, components of exemplary polymerizable compositions that are useful in the formation of polyurethane-based carrier layers according to methods of the invention are described in U.S. Pat. No. 8,828,303, entitled "Methods for Polymerizing Films In-Situ Using a Radiation Source," incorporated herein by reference in its entirety. In preferred embodiments, the polymerizable compositions according to this aspect of the invention comprise, and more preferably, consist essentially of, aliphatic components.

In exemplary embodiments, polymerization of the polymerizable composition is initiated using at least one radiation source selected from ultraviolet radiation, thermal radiation, and electron beam radiation. Methods of the invention can utilize continuous processing or batch processing. For example, continuous processing, such as web-based, in-situ polymerization of the polyurethane-based carrier layer using relatively low energy ultraviolet radiation (e.g., having an energy of less than about 100 mW/cm$^2$), can be used in one embodiment of the invention. As another example, batch processing, such as coating an ultraviolet-curable composition onto a discrete substrate and irradiating the same to form the polyurethane-based carrier layer in-situ can be used in another embodiment of the invention.

According to a preferred aspect of methods of the invention, the polymerizable composition for formation of the carrier layer is essentially free of solvents. Unlike hot-melt systems that may be essentially free of solvents, however, the polymerizable composition according to preferred aspects of the invention is a liquid at room temperature when applied to a substrate on which it is to be polymerized. In addition to, for example, environmental and safety concerns associated with solvent-based processing, solvent-based processing typically entails use of elevated temperatures for effective removal of excess solvent from the polymerized composition. Thus, it is preferred that carrier layers are essentially free of unreacted solvent. Accordingly, it is preferred that the polymerizable compositions from which they are formed are essentially free of solvents. Sustainable paint technology is facilitated according to these preferred embodiments.

Any suitable additives can be present in the carrier layer. Other additives are selected as known to those skilled in the art based on the intended application. Those skilled in the art are readily able to determine the amount of such additives to use for the desired effect. When the carrier layer is pigmented, it was surprisingly found that a lower loading of pigment is needed to impart the same color to the carrier layer than the amount of pigment required to be added to conventionally formed polymer films functioning as the carrier layer. Thus, any detrimental effect on extensibility or other properties of the carrier layer arising due to the addition of the pigment is minimized according to the invention. According to one aspect of the invention, the resulting carrier layer is understood by those of ordinary skill in the art to be elastomeric in nature. To achieve these benefits in a polyurethane-based or other similar polymer film that is polymerized from multiple reacted components, preferably color is added to at least two of the multiple components that are compounded and reacted. As such, benefits in processing efficiency result.

According to one embodiment of the invention, the carrier layer has a thickness of about 5 microns to about 1,250 microns. According to a further embodiment, the carrier layer has a thickness of about 8 microns to about 260 microns. Each of the "n" number of individual film layers therein can be as thin as about 5 microns and up to about 50 microns in thickness, the presence of thicker layers being particularly useful in, for example, ballistic applications. However, to impart greater recoverability, a carrier layer having a thickness of about 220 microns or less is used according to one aspect of the invention. According to further aspects, the carrier layer has a thickness of about 180 microns or less. For example, the carrier layer can have a thickness of about 120 microns to about 180 microns. Not only is recoverability of the carrier layer, and hence overall paint film applique, enhanced by using a thinner carrier layer, overall cost of the paint film applique is reduced in this manner.

As compared to conventional paint film appliques including a conventionally formed carrier layer (i.e., which conventional formation typically involves extrusion and other methods for formation of a film from an already polymerized composition, where polymerization of the material used to form the film is essentially complete prior to formation of the film therefrom), paint film appliques of the invention do not rely on such a layer as the carrier layer, the result being an unexpected improvement in one or more desired properties in addition to the processing efficiencies imparted thereby. For example, problems associated with dimensional instability of extruded films—such as those described in U.S. Pat. No. 5,985,079—can be minimized.

According to one aspect of the invention, an improved polyurethane-based carrier layer in paint film appliques of the invention is polymerized in-situ. For example, U.S. Pat. No. 8,828,303 and U.S. Patent Publication No. US-2011-0137006-A1, both incorporated herein by reference, describe methods and films formed by such in-situ polymerization. Surprisingly, use of an in-situ polymerized carrier layer was found to facilitate improvements in physical properties desired in addition to the processing efficiencies imparted thereby.

Unlike conventional carrier layers, which are typically extruded, in-situ polymerized carrier layers of the invention are not generally thermoplastic in nature. Nevertheless, in-situ polymerized carrier layers of the invention look and feel very similar to conventional extruded carrier layers. An improved polymer architecture, however, provides in-situ polymerized carrier layers of the invention with some significantly different properties, including dimensional stability.

Another significantly different property is solvent resistance. The solvent resistance of preferred in-situ polymerized carrier layers of the invention approximates that associated with conventional crosslinked (i.e., thermoset) materials. As is typical with thermoplastic materials, extruded materials will generally dissolve completely when immersed in a solvent, e.g., tetrahydrofuran, while the in-situ polymerized materials of the invention exhibit only minor swelling when immersed in the same solvent.

Another significantly different property is storage modulus. As is typical with thermoplastic materials, extruded materials generally exhibit a continual drop in storage modulus with increasing temperature. The storage modulus of preferred in-situ polymerized carrier layers of the invention is significantly different, however, in that it exhibits a rubbery plateau region, a characteristic that is consistent with lightly crosslinked elastomers. In one embodiment, the storage modulus of preferred in-situ polymerized polyurethane-based carrier layers is about two orders of magnitude higher than that of thermoplastic polyurethane at conventional extrusion temperatures.

According to another aspect of the invention, the improved polyurethane-based carrier layer in paint film appliques of the invention has a peak loss factor of at least about 0.5, at least about 0.8, or even at least about 1.2 when tested as a standalone film according to the Loss Factor Test Method described below.

As illustrated in FIG. 1, the peak loss factor tested according to the Loss Factor Test Method described below of extruded (i.e., conventionally formed) polyurethane carrier layer films (i.e., as illustrated by the data curves labeled A, B, and C, representing extruded polyurethane-based carrier layers commercially available from Argotec, LLC (Greenfield, MA) under the respective trade designations, ARGOTEC 49510, ARGOTEC 49510-60DV, and ARGOTEC 46510) was significantly lower than those according to the invention, which had a peak loss factor of greater than 0.5 (i.e., as illustrated by the data curves labeled 1 and 2). As also illustrated in FIG. 1, the peak loss factor tested for extruded polyurethane carrier films occurred at about 25° C., while the peak loss factor tested for polyurethane-based films used as the carrier layer in paint film appliques of the invention occurred at about a temperature of at least about 35° C.

In addition, the half-height loss factors (the loss factor which is one-half the value of that of the peak loss factor, of which there are two for each curve) occurred across a temperature span of less than about 40° C., less than about 30° C. in some embodiments, and even less than about 20° C. in some embodiments, for tested polyurethane-based films used as the carrier layer in paint film appliques of the invention as opposed to occurring across a temperature span of greater than about 40° C., and even greater than about 45° C. in the exemplified embodiments, for extruded polyurethane-based polymer films. For the data curves labeled A and B in FIG. 1, the half-height loss factor was measured to be 53° C. For the data curve labeled C in FIG. 1, the half-height loss factor was measured to be 49° C. For the data curve labeled 1 in FIG. 1, the half-height loss factor was measured to be 18° C. For the data curve labeled 2 in FIG. 1, the half-height loss factor was measured to be 22° C.

Figure 2:
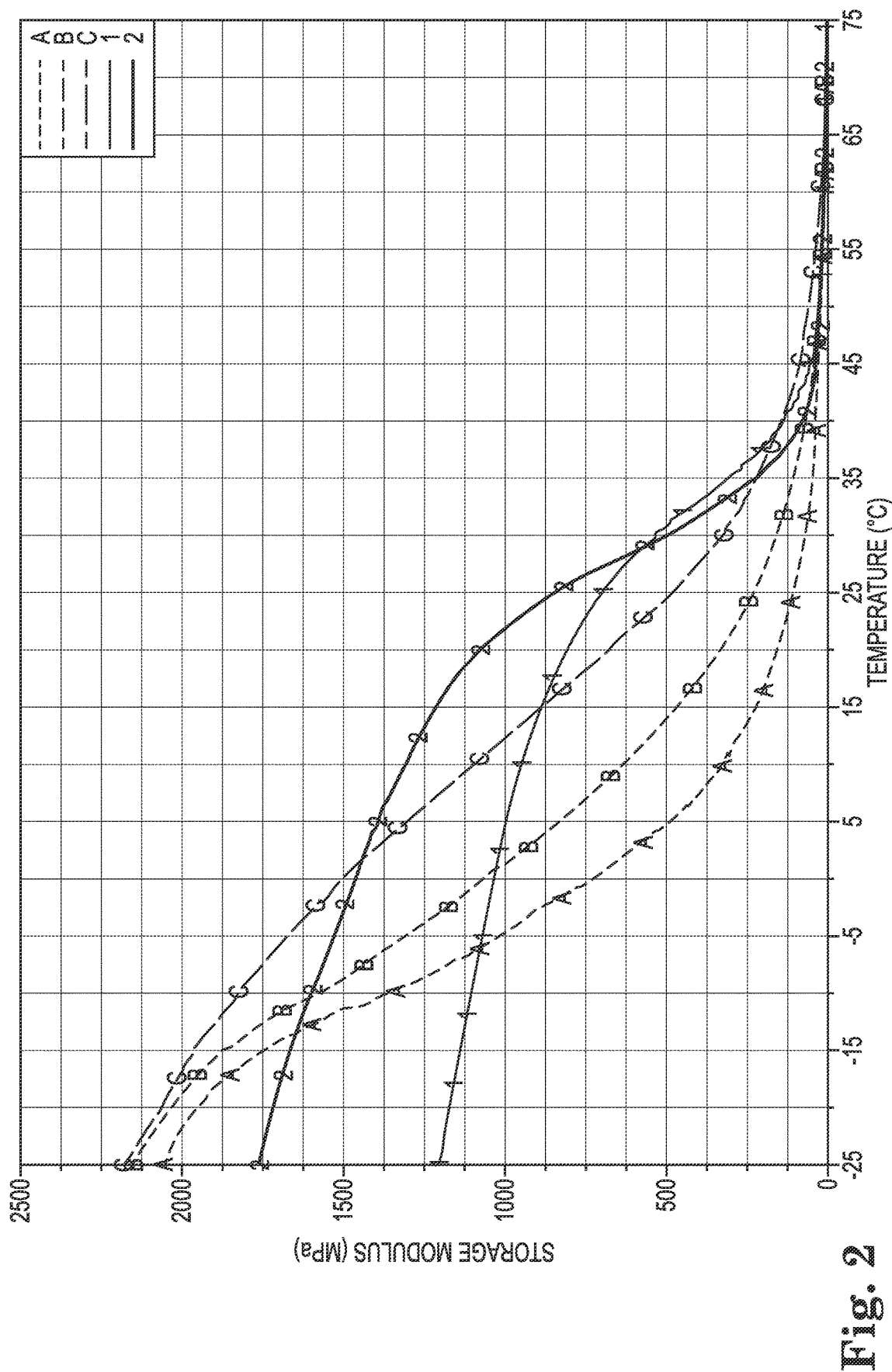
FIG. 2 is a graph of Storage Modulus versus Temperature for in-situ polymerized polyurethane carrier layers useful in paint film appliques of the invention as compared to those properties associated with conventionally formed polyurethane carrier layers.

As illustrated in FIG. 2, the storage moduli tested according to the Storage Modulus Test Method described below of extruded (i.e., conventionally formed) polyurethane films (i.e., as illustrated by the data curves labeled A, B, and C) decreased to a particular value at relatively lower temperatures than those of polyurethane-based polymer films used as the carrier layer in paint film appliques of the invention.

As described above, preferably carrier layers in paint appliques of the invention are defect-free. As used herein, a "defect" is understood to be a visual imperfection such as, for example, a gel particle, a die line, or a gauge line. As used herein, "defect-free" refers to polymer films with no more than the maximum allowable defects shown in Table 1, as set forth in terms of the maximum defect diameter.

TABLE 1

| Defect Diameter (mm) | Maximum Allowable Defects per Square Inches (SquareCentimeters) of Sample [Sample Size] |
|---|---|
| 0.1-0.6 | None |
| 0.7-1.4 | 10 per 25 (160) [5-inch × 5-inch (12.7-cm × 12.7-cm) sample] |
| 1.5-2.9 | 3 per 25 (160) [5-inch × 5-inch (12.7-cm × 12.7-cm) sample] |
| 3.0-5.0 | 1 per 600 (3,870) [12-inch × 50-inch (30.5-cm × 127-cm) sample] |

Preferably, no defects are detectable within the polymer film when viewed by an unaided human eye. More preferably, no defects are detectable within the polymer film when viewed with magnification up to about 50×.

Advantageously, in preferred embodiments, conventional p-gels cannot form as the polymer film used as the carrier layer is not formed in a conventional reactor. Likewise, in preferred embodiments, conventional e-gels cannot form as the polymer film is not formed using a conventional extruder. Once polymerized, preferred polymer films used as carrier layers in paint film appliques of the invention have never undergone thermoplastic deformation, have never been through an extruder, and have never experienced a thermal excursion at conventional extrusion temperatures. In addition, given that preferred polymer films are not formed using a conventional extruder, processing aids—e.g., slip and antiblock additives—that are known to contribute to gel formation and that would conventional be required and used in such methods of formation need not be, and are preferably excluded from, methods for formation of the polymer films when assembling paint film appliques according to the invention. The resulting polymer films are defect-free, and the paint film appliques of which they are a part have reduced defects.

Color Layer

While more than one color layer can be used in paint film appliques of the invention, the following description is made with reference to one such layer for simplicity only. Recognize that, if multiple color layers are used, each color layer can be the same or different.

The color layer comprises any suitable material and provides desired aesthetics when the paint film applique is applied to a surface. The color layer can be a continuous or discontinuous layer. Note that the color layer may consist essentially of graphics, patterns, and the like, which results in the layer being a discontinuous layer and/or a non-planar layer.

The color layer comprises at least one color-inducing component. In its broadest sense, color-inducing components include those that affect merely opacity of the color layer, those that affect merely spectral color of the color layer, and those that affect merely tint, shade, or tone of the color layer. In the case of those components affecting opacity, an opaque color layer and, hence, an opaque paint film applique is obtainable. In the case of components affecting tint, shade, or tone, understand that a tint is the mixture of a color with white, which increases lightness. A shade is the mixture of a color with black, which reduces lightness. A tone is produced either by the mixture of a color with gray, or by both tinting and shading. Mixing a color with any neutral color (including black, gray and white) reduces the chroma, or colorfulness, while the hue remains unchanged.

Color-inducing components useful in the present invention include, for example, what those of ordinary skill in the art generally refer to as pigments, paints, tints, metallic flakes, and dyes. Pigment is an exemplary color-inducing component. In an exemplary embodiment, the color layer comprises ink. Any suitable commercially available ink can be used. Non-limiting examples of suitable inks include pigmented acrylic ink (including pigmented fast-dry acrylic ink), pigmented urethane ink, epoxy ink, and a urethane enamel coating such as that sold by PRC Desoto International, Inc. of Glendale, CA under the trade designation, DESOTHANE HS.

Any suitable additives can optionally be included in the color layer. For example, stabilizers (e.g., antioxidants, heat stabilizers, and UV-stabilizers), crosslinkers (e.g., aluminum or melamine crosslinkers), corrosion inhibitors, plasticizers, photocrosslinkers, additional colorants, fillers, and other conventional additives as known to those of ordinary skill in the art can be incorporated into the color layer. If desired, an adhesion promoter may be included in the color layer. However, in preferred embodiments, the material comprising the color layer is selected to be chemically compatible with adjacent layers of the paint film applique, including the carrier layer. Further, due to the fact that the carrier layer is in-situ polymerized on an adjacent color layer, adhesion between the layers is enhanced. Although not intending to be bound by theory, it is believed that interlayer entanglement or crosslinking results between the carrier layer and the color layer on which it is in-situ polymerized. Thus, an adhesion promoter is not required according to preferred embodiments of the invention.

Preferably, the color layer is essentially free of components that may tend to migrate to the outer surface of the paint film applique or to an interface therein, where such components may promote interlayer delamination or otherwise detrimentally affect the adherence of the paint film applique to adjacent surfaces or layers. The color layer is also preferably resistant to chemicals to which it may be exposed during use of the paint film applique. For example, it is preferred that the color layer is resistant to degradation by water and hydraulic fluids (e.g., those sold by TBM, Inc. of St. Louis, MO under Solutia, Inc.'s SKYDROL trade designation), particularly when the color layer comprises an outer layer of the paint film applique after it is applied to a surface.

The color layer can be formed according to any suitable method. In one embodiment, the color layer is solution-cast from a polymerized composition. For example, the color layer can be cast from an organic solvent solution. As another example, the color layer can be cast from an aqueous solution.

In yet another embodiment, the color layer is polymerized in-situ. As noted above, U.S. Pat. No. 8,828,303 and U.S. Patent Publication No. US-2011-0137006-A1 describe methods and films formed by such in-situ polymerization. A preferred aspect of this embodiment is on-web polymerization of the color layer from a solvent-free polymerizable composition that is liquid at room temperature in neat form.

In a preferred embodiment, the color layer is a reactive polymer film. By "reactive," it is to be understood that the polymer film comprises chemical functionality enabling the carrier layer polymerized thereon to form covalent bonds with the color layer at the interface between the two adjacent layers. According to one aspect of this embodiment, the reactive polymer film comprises hydroxyl functional groups capable of reacting with, for example, isocyanate functional groups in the polymerizable composition forming the carrier layer.

The color layer comprises any suitable thickness. According to one embodiment of the invention, the color layer has a thickness of about 5 microns to about 1,250 microns. According to a further embodiment, the color layer has a thickness of about 8 microns to about 260 microns. In still another further embodiment, the color layer has a thickness of about 12 microns to about 125 microns. In still another further embodiment, the color layer has a thickness of about 25 microns to about 75 microns. In yet a further embodiment, the color layer has a thickness of about 8 microns to about 25 microns. So long as, for example, the color of the paint film applique outwardly visible when the paint film applique is applied to a surface is sufficient, thickness of the color layer can vary substantially without departing from the spirit and scope of the invention. While flexibility of the overall paint film applique is enhanced by using a thinner color layer, overall cost of the paint film applique can also be reduced in this manner.

Optional Adhesive Layer

When present, the adhesive layer is positioned adjacent and on a major planar side of the laminate comprising at least one carrier layer and at least one color layer, opposite that major planar side from that on which any optional topcoat layer is present. Any suitable adhesive can be used for the adhesive layer according to the invention. In a preferred embodiment, the adhesive layer comprises a pressure-sensitive adhesive.

While any suitable chemistry can be used for the base polymer in the adhesive layer, (meth)acrylate—i.e., acrylate and methacrylate—chemistry is preferred. However, other suitable chemistries are known to those skilled in the art and include, for example, those based on synthetic and natural rubbers, polybutadiene and copolymers thereof, polyisoprene and copolymers thereof, and silicones (e.g., polydimethylsiloxane and polymethylphenylsiloxane). Any suitable additives can be present in conjunction with the base polymer in the adhesive layer.

In particular, an adhesive based on 2-ethyl hexyl acrylate, vinyl acetate, and acrylic acid monomers polymerized as known to those skilled in the art was found useful in one embodiment of the invention. The adhesive can be cross-linked, for example, using conventional aluminum or melamine crosslinkers.

In one embodiment, the adhesive layer has a thickness of about 5 microns to about 150 microns. In a further embodiment, the adhesive layer has a thickness of about 10 microns to about 100 microns. In yet a further embodiment, the adhesive layer has a thickness of about 30 microns to about 100 microns. However, the thickness of the adhesive layer can vary substantially without departing from the spirit and scope of the invention.

Until its application on a surface, the adhesive layer can be protected using, for example, a conventional release liner. As such, the sheet can be stored and shipped easily in roll or other forms until its application.

Optional Topcoat Layer

In general, any outwardly exposed non-adhesive layer on a major planar side of the carrier layer and color layer laminate opposite any adhesive layer in paint film appliques of the invention is referred to as a "topcoat layer." Consistent with its name, the optionally present topcoat layer is an outwardly exposed, exterior layer of the paint film applique when the paint film applique is applied to an article. Any suitable type of material can be used for the topcoat layer in paint film appliques of the invention. For example, the topcoat layer can comprise as its base polymer a polycarbonate, a polyvinyl fluoride, a poly(meth)acrylate (e.g., a polyacrylate or a polymethacrylate), a polyurethane, modified (e.g., hybrid) polymers thereof, or combinations thereof. See U.S. Pat. No. 4,476,293 for a description of exemplary polycarbonate-based polyurethanes useful for the topcoat layer of the invention. See also U.S. Patent Publication No. US-2008-0286576-A1, incorporated herein by reference, for a description of further exemplary topcoat layers.

In one embodiment, a topcoat layer is applied (e.g., by spraying or painting it) on the paint film applique after adherence of the paint film applique to an underlying surface. Preferably, in this embodiment, the topcoat layer is applied such that no paint film applique is exposed to the environment when the applique is adhered to a surface for use. Still further, when more than one paint film applique is used in combination with others on a surface, the topcoat layer preferably covers and protects seams between adjacent paint film appliques from exposure to the environment.

In another embodiment, the topcoat layer is one of the layers included within the paint film applique. For example, a multi-stage paint according to the invention comprises the carrier layer (or multiples thereof, if desired) in combination with at least one color layer flanked by at least one adhesive layer on one side (i.e., the foregoing layers in combination being akin to a basecoat in a conventional paint system) and at least one topcoat layer (i.e., being akin to a clearcoat in a conventional paint system) on the other side. A two-stage paint according to this exemplary embodiment has one topcoat layer. A three-stage paint according to this exemplary embodiment has two adjacent, but distinct, topcoat layers.

The topcoat layer can comprise any suitable chemistry. In general, the topcoat layer provides one or more properties including the following: environmental resistance, chemical resistance, abrasion resistance, scratch resistance, optical transparency, and other often desirable properties. While the carrier layer or color layer, whichever would be otherwise outwardly exposed when applying the paint film applique to an article, can provide the properties desired, making the need for a topcoat layer moot, especially when that is not the case, a topcoat layer is beneficially present. According to an exemplary embodiment, the topcoat layer comprises a material with the following properties: non-yellowing, gloss retention (e.g., maintaining of gloss on the order of about 80 to about 90 gloss units), and extensibility.

In an exemplary embodiment, the topcoat layer comprises a polyurethane-based material. Many suitable topcoats are commercially available, including for example, polyurethane coatings sold by PRC Desoto International, Inc. of Glendale, CA under the DESOTHANE HS trade designation (e.g., DESOTHANE HS BAC 900 (CA8000/B900A or CA8000/6900B)) or those sold by Akzo-Nobel Aerospace Coatings of Waukegan, IL under the ECLIPSE trade designation (e.g., ECLIPSE BAC 900).

Preferably, chemistry of the topcoat layer is selected to facilitate its bonding to the underlying layers of the paint film applique. According to one aspect of this embodiment, the surface tension of the underlying layer of the paint film applique is within about 5 dynes per centimeter of the surface tension of the overlying topcoat layer. According to another aspect of this embodiment, the topcoat layer comprises excess isocyanate-functional moieties reactive with excess isocyanate-reactive moieties in the underlying layer of the paint film applique on which it is applied. According to this aspect of the invention, covalent bonds form between the topcoat layer and the underlying layer of the paint film applique. Such covalent bonds are typically more robust than other types of bonds (e.g., those relying on Van Der Waals forces, such as those typically associated with use of pressure sensitive adhesives) and are, therefore, preferred.

Preferably, to maximize gloss retention, soil resistance, and other desirable performance properties of the paint film applique, the topcoat layer is of relatively high molecular weight. That is, while the topcoat layer can be formed by extrusion according to some embodiments of the invention, the topcoat layer is preferably of a sufficient molecular weight that extrusion thereof is not practical (i.e., if a polyurethane, the polyurethane is not considered extrusion-grade polyurethane by those of ordinary skill in the art). In a preferred embodiment, the topcoat layer is in-situ polymerized in addition to the carrier layer of the invention.

In one embodiment, when present, the topcoat layer has a thickness of about 1 microns to about 28 microns. In a further embodiment, the topcoat layer has a thickness of about 5 microns to about 20 microns. In still a further embodiment, the topcoat layer has a thickness of about 5 microns to about 15 microns. In yet a further embodiment, the topcoat layer has a thickness of about 5 microns to about 12 microns. In yet a further embodiment, the topcoat layer has a thickness of about 5 microns to about 7 microns. However, the thickness of the topcoat layer can vary substantially without departing from the spirit and scope of the invention.

To protect the topcoat layer, when present, a polymer liner (e.g., a clear polyester liner) or the like may be used and removed before or after the paint film applique is applied to a substrate.

Paint Film Applique Formation

Each of the individual layers of the paint film applique is formed and assembled into a multi-layer paint film applique according to the knowledge of those skilled in the art. In forming the carrier layer, however, the carrier layer is formed in-situ on the color layer, resulting in a laminate of the carrier layer and supported color layer, after which time the optional adhesive layer and/or optional topcoat layer of the paint film applique may be formed on one major surface of the laminate.

For preparation of the adhesive layer, any suitable method can be used. For example, as an alternative to direct (e.g., in-situ) formation of the adhesive layer on the carrier layer, an adhesive film of the desired thickness can be cast onto a release film according to one embodiment and as known to those skilled in the art. In that embodiment, the adhesive film supported on the release film can then be assembled with the carrier layer, with the release film being removed before adherence of the paint film applique to a surface of an article.

While not otherwise limited in terms of methodology and order of assembly, at least the carrier layer is polymerized in-situ. According to a further aspect of this embodiment, each of the other individual layers of the paint film applique is prepared before assembly into the paint film applique. Any suitable method for formation of each of the other individual layers can be used as known to those skilled in the art.

For preparation of the optional topcoat layer, any suitable method can be used. For example, a film comprising a topcoat layer of a desired thickness can be cast onto a smooth film (e.g., polyester film) according to one embodiment and as known to those skilled in the art to form a supported topcoat layer. In one embodiment, the supported topcoat layer is then assembled onto the outwardly exposed side of the laminate comprising the at least one carrier layer and the at least one color layer—i.e., a major surface of the laminate opposite from that on which any optional adhesive layer is assembled. The smooth film used for formation of the topcoat layer can remain in the assembly until application of the paint film applique to a surface of an article in order to provide extra protection during shipping and storage of the sheet. According to this embodiment, any suitable method can be used to assemble the topcoat layer with the laminate. According to another embodiment, the topcoat layer is formed by direct coating the topcoat layer onto the laminate according to conventional methods.

While the above-described processes entail formation of individual layers and then adherence of those layers together to form the paint film applique, according to another embodiment of the invention, some of the paint film applique's layers can be formed simultaneously by, for example, co-extrusion of the polymerizable compositions starting in their liquid form, which step is typically performed at a temperature below about 40° C.—e.g., about room temperature in one embodiment. In addition to the carrier layer, layers other than the carrier layer may be polymerized in-situ into a film format as described in, for example, U.S. Pat. No. 8,828,303 and U.S. Patent Publication No. US-2011-0137006-A1. No matter what method is used, the process can be a continuous or batch process.

Paint Film Applique Use

Paint film appliques of the invention are useful in a range of indoor and outdoor applications in, for example, the transportation, architectural and sporting goods industries. Paint film appliques can advantageously be applied to at least a portion of a surface of any article where paint is desired. Such articles include, for example, motorized vehicles (e.g., automobiles and airplanes) and non-motorized vehicles (e.g., conventional bicycles) amongst a multitude of other applications. The surface to which the paint film appliques are applied can be otherwise painted or unpainted.

Although paint film appliques of the invention can have textured outwardly exposed surfaces when applied to an underlying substrate, preferably paint film appliques of the invention have smooth surfaces and a substantially uniform thickness throughout in order to maximize their capability of providing desired aesthetic properties to a surface.

During use, a paint film applique is applied to a surface, preferably in such a way as to conform to the shape of the surface. Particularly when applying pain film appliques to non-planar surfaces, recoverability is important and preferred. If a paint film applique is not very recoverable, micro-cracking can occur when the applique is stretched too far. Relief cuts may be needed in that case in order to apply such paint film appliques to substrates, particularly those having a complex surface of convex and concave features. However, according to preferred embodiments of the invention, relief cuts are not necessary when applying paint film appliques of the invention to complex surfaces. Such paint film appliques are readily conformable due to their recoverability.

Paint film appliques of the invention can be readily and easily applied to a surface of an article based on knowledge of those skilled in the art. The adhesive layer, if present, is generally adhered to the surface to which the paint film applique is applied after removal of any release liner present thereon to expose the adhesive. When a pressure-sensitive adhesive layer is used, the paint film applique can be more easily repositioned before being firmly adhered to a surface.

EXAMPLES

Exemplary Test Methods

Exemplary embodiments and applications of the invention are described in relation to the following testing methods.

Loss Factor Test Method

A dynamic mechanical analyzer available from TA Instruments (New Castle, DE) under the trade designation, TA Instruments DMA Q800 was used to perform this test in tension mode. Nominal sample sizes having a length of 5-12 mm, a width of 4-8 mm, and a thickness of 0.02-0.2 mm were used. A frequency of 1 Hz, strain of 0.3%, and ramp rate of 3° C./minute were used to measure values for determination of the loss factor of a sample.

Storage Modulus Test Method

A dynamic mechanical analyzer available from TA Instruments (New Castle, DE) under the trade designation, TA Instruments DMA Q800 was used to perform this test in tension mode. Nominal sample sizes having a length of 5-12 mm, a width of 4-8 mm, and a thickness of 0.02-0.2 mm were used. A frequency of 1 Hz, strain of 0.3%, and ramp rate of 3° C./minute were used to measure values for determination of the storage modulus of a sample.

Solvent Resistance Test Method

Small discs (25 mm diameter×0.16 mm thick) of each material were immersed in separate jars, each containing 16 mL of tetrahydrofuran (THF). Dissolution and/or swelling of the discs of each example was evaluated after five minutes. To evaluate each sample, if the disc was no longer intact, the contents of the jar were poured through a 200 mesh stainless steel filter. If no solid or gel residue was retained on the screen, this verified that the material of the disc had completely dissolved and had not simply broken up into fine pieces. If the disc was intact still at five minutes, the disc was allowed to remain immersed in the THF for six hours total. After six hours total of immersion, the disc was still was removed from the jar and the diameter thereof was measured immediately. Thereafter, the disc was allowed to air dry. After about twenty-four hours, the diameter of the disc was measured again.

Comparative Example C1

A disc of ARGOTEC 49510 thermoplastic polyurethane film, commercially available from Argotec, LLC (Greenfield, MA), was evaluated according to the Solvent Resistance Test Method described above. After five minutes, the disc was no longer intact and confirmed to have completely dissolved.

Comparative Example C2

A disc of ARGOTEC 46510 thermoplastic polyurethane film, commercially available from Argotec, LLC (Greenfield, MA), was evaluated according to the Solvent Resistance Test Method described above. After five minutes, the disc was no longer intact and confirmed to have completely dissolved.

Example 1

A disc of Film 3 prepared according to the Exemplary Formulations below (see Tables 2 and 5) was evaluated according to the Solvent Resistance Test Method described above. After immersion for six hours, the diameter of the disc was measured to be 160% of its original size. After air drying, the disc had returned to its original 25-mm diameter, confirming evaporation of the THF.

Exemplary Formulations

Defect-free polymer films and paint film appliques comprising the same are preparable according to methodology described in U.S. Pat. No. 8,828,303 and using components for each layer described below.

Components

TABLE 2

| Component | Commercial Product Source | Description |
| --- | --- | --- |
| High MW Polyol | entrochem, inc., Columbus, Ohio, under the ECA-457 trade designation | Polyether polyol having a number average molecular weight greater than 2,000 |
| Mid MW Polyol A | entrochem, inc., Columbus, Ohio, under the ECA-456 trade designation | Polyether polyol having a number average molecular weight between 1,400 and 2,000 |
| Mid MW Polyol B | entrochem, inc., Columbus, Ohio, under the ECA-392 trade designation | Caprolactone-based polyol having a number average molecular weight between 1,400 and 2,000 |
| Mid MW Polyol C | entrochem, inc., Columbus, Ohio, under the ECA-495 trade designation | Polyether polyol having a number average molecular weight between 900 and 1,400 |
| Mid MW Polyol D | entrochem, inc., Columbus, Ohio, under the ECA-464 trade designation | Polyether polyol having a number average molecular weight between 400 and 900 |
| Low MW Polyol | entrochem, inc., Columbus, Ohio, under the ECA-386 trade designation | Chain-extender polyol having a number average molecular weight of less than 400 |
| Catalyst | entrochem, inc., Columbus, Ohio, under the ECA-388 trade designation | Tin catalyst |
| UV Initiator | entrochem, inc., Columbus, Ohio, under the ECA-576 trade designation | Photoinitiator |
| UV Stabilizer | entrochem, inc., Columbus, Ohio, under the ECA-460 trade designation | Heat and light stabilizer system |
| Isocyanate | entrochem, inc., Columbus, Ohio, under the ECA-387 trade designation | Aliphatic polyisocyanate |
| Adhesive | entrochem, inc., Columbus, Ohio, under the ECA-153 trade designation | Acrylic pressure sensitive adhesive |

Carrier Layer

Three different carrier layers for paint film appliques of the invention are formed based on the components described in Table 2 and the proportionate amounts shown in Tables 3-5. Weight percentages are reported based on overall weight of the resulting film comprising the carrier layer. The components described in Table 2 are in-situ polymerized on a color layer (described below).

TABLE 3

(Film 1)

| Weight % | Component |
| --- | --- |
| 53.0319 | High MW Polyol |
| 29.0160 | Mid MW Polyol A |
| 0.5223 | Low MW Polyol |
| 0.0049 | Catalyst |
| 0.9852 | UV Initiator |
| 0.4926 | UV Stabilizer |
| 10.9471 | Isocyanate |

TABLE 4

(Film 2)

| Weight % | Component |
| --- | --- |
| 37.4221 | Mid MW Polyol B |
| 5.6133 | Mid MW Polyol C |
| 8.4200 | Low MW Polyol |
| 0.0049 | Catalyst |
| 0.9852 | UV Initiator |
| 0.4926 | UV Stabilizer |
| 47.0620 | Isocyanate |

TABLE 5

(Film 3)

| Weight % | Component |
| --- | --- |
| 10.5903 | Mid MW Polyol B |
| 22.5044 | Mid MW Polyol D |
| 10.4844 | Low MW Polyol |
| 0.0049 | Catalyst |
| 0.9852 | UV Initiator |
| 0.4926 | UV Stabilizer |
| 54.9382 | Isocyanate |

Color Layer

A color layer is formed by blending a solvent-based polyurethane coating available from entrochem, inc., Columbus, Ohio, under the ECA-518 trade designation with a color concentrate available from entrochem, inc., Columbus, Ohio, under the ECA-505 trade designation. The blend is coated to a dry thickness of about 10 microns to about 100 microns.

Topcoat Layer

An acrylic-based polyurethane topcoat layer for paint film appliques of the invention is formed from aliphatic acrylic polyols and aliphatic polyisocyanate polymer, which components are polymerized on the carrier layer in-situ after being coated to a thickness of about 10 microns.

Adhesive Layer

An adhesive layer for paint film appliques of the invention is formed based on the Adhesive component described in Table 2 and positioned on the color layer opposite the carrier layer.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

Any theories set forth herein are subject to change pending further testing and analysis. As such, the inventors do not intend to be bound by any theories proffered herein as to, for example, what factors contribute to physical properties described in conjunction with paint film appliques and individual layers therein.

The invention claimed is:

1. A method of forming a paint film applique, the method comprising steps of:
   forming an in-situ polymerized color layer from a polymerizable composition for the color layer, wherein the color layer is a reactive polymer film;
   forming an in-situ polymerized carrier layer from a polymerizable composition for the carrier layer, wherein the carrier layer is in-situ polymerized on the color layer and covalent bonds form with the color layer at an interface between the color layer and the carrier layer;
   optionally, forming a topcoat layer; and
   optionally, forming an adhesive layer opposite the topcoat layer,
   wherein at least the in-situ polymerized carrier layer and the in-situ polymerized color layer are formed by co-extrusion of the polymerizable compositions to simultaneously form the at least two layers.

2. The method of claim 1, wherein the paint film applique is opaque.

3. The method of claim 1, wherein the in-situ polymerized color layer comprises pigment.

4. The method of claim 1, wherein the in-situ polymerized carrier layer is defect-free.

5. The method of claim 1, wherein the in-situ polymerized carrier layer is polyurethane-based.

6. The method of claim 1, wherein the in-situ polymerized carrier layer is essentially free of unreacted solvent.

7. The method of claim 1, wherein the paint film applique comprises the topcoat layer, the in-situ polymerized carrier layer, the in-situ polymerized color layer, and the adhesive layer in sequence.

8. The method of claim 1, wherein the paint film applique comprises the topcoat layer, the in-situ polymerized color layer, the in-situ polymerized carrier layer, and the adhesive layer in sequence.

9. The method of claim 1, comprising the step of forming the topcoat layer.

10. The method of claim 9, wherein the topcoat layer is polyurethane-based.

11. The method of claim 1, wherein the in-situ polymerized carrier layer has a peak loss factor of at least about 0.5 when tested as a standalone film according to the Loss Factor Test Method described herein.

12. The method of claim 1, wherein the in-situ polymerized carrier layer has a peak loss factor that occurs at about a temperature of at least about 35° C. when tested as a standalone film according to the Loss Factor Test Method described herein.

13. The method of claim 1, wherein half-height loss factors of the in-situ polymerized carrier layer occur across a temperature span of less than about 40° C. when tested as a standalone film according to the Loss Factor Test Method described herein.

14. The method of claim 1, wherein the adhesive layer is formed and present and comprises a pressure-sensitive adhesive.

15. The method of claim 14, further comprising a step of providing a release film on an exterior surface of the adhesive layer.

16. The method of claim 1, wherein overall thickness of the paint film applique is less than about 130 microns thick.

17. A method of using the paint film applique formed according to the method of claim 1 to paint a surface on a motorized vehicle, the method comprising:
   providing the paint film applique; and
   applying the paint film applique to the surface of the motorized vehicle.

18. The method of claim 1, wherein the in-situ polymerized carrier layer comprises the reaction product of components comprising an aliphatic polyisocyanate and at least three polyols, one of which polyols has a number average molecular weight between 1,400 and 2,000, and one of which polyols is a polyether polyol.

19. The method of claim 1, wherein the in-situ polymerized carrier layer comprises the reaction product of components comprising an aliphatic polyisocyanate and at least three polyols, one of which polyols has a number average molecular weight between 900 and 1,400, and one of which polyols is a polyether polyol.

20. The method of claim 1, wherein the in-situ polymerized carrier layer is formed from a polymerizable composition that is essentially free of solvents.

21. The method of claim 1, wherein polymerization of a polymerizable composition from which the in-situ polymerized carrier layer is formed is initiated using at least one radiation source selected from ultraviolet radiation and electron beam radiation.

22. The method of claim 1, wherein polymerization of the carrier layer begins no more than about thirty seconds before or after the polymerizable composition for the carrier layer is positioned into a desired film format.

23. A method of forming a paint film applique, the method comprising steps of:
   forming a color layer, wherein the color layer is a solution-cast, reactive polymer film;
   forming an in-situ polymerized carrier layer, wherein the carrier layer is in-situ polymerized on the color layer and covalent bonds form with the color layer at an interface between the color layer and the carrier layer;
   optionally, forming a topcoat layer; and
   optionally, forming an adhesive layer opposite the topcoat layer.

24. The method of claim 23, wherein the color layer is cast from an organic solvent solution.

25. The method of claim 23, wherein the color layer is cast from an aqueous solution.

26. The method of claim 23, wherein the paint film applique comprises the topcoat layer, the in-situ polymerized carrier layer, the color layer, and the adhesive layer in sequence.

27. The method of claim 23, wherein the paint film applique comprises the topcoat layer, the color layer, the in-situ polymerized carrier layer, and the adhesive layer in sequence.

28. The method of claim 23, wherein the in-situ polymerized carrier layer comprises the reaction product of components comprising an aliphatic polyisocyanate and at least three polyols, one of which polyols has a number average molecular weight between 1,400 and 2,000, and one of which polyols is a polyether polyol.

29. The method of claim 23, wherein the in-situ polymerized carrier layer comprises the reaction product of components comprising an aliphatic polyisocyanate and at least three polyols, one of which polyols has a number average molecular weight between 900 and 1,400, and one of which polyols is a polyether polyol.

30. The method of claim 23, wherein polymerization of the carrier layer begins no more than about thirty seconds before or after the polymerizable composition for the carrier layer is positioned into a desired film format.

* * * * *